United States Patent
Chan et al.

(10) Patent No.: US 10,564,357 B2
(45) Date of Patent: *Feb. 18, 2020

(54) PLASTIC OPTICAL FIBER BUS NETWORK USING TAPERED MIXING RODS

(71) Applicant: The Boeing Company, Chicago, IL (US)

(72) Inventors: Eric Y. Chan, Mercer Island, WA (US); Dennis G. Koshinz, Bellevue, WA (US); Tuong Kien Truong, Redmond, WA (US); Henry B. Pang, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/954,674

(22) Filed: Jul. 30, 2013

(65) Prior Publication Data

US 2015/0037046 A1  Feb. 5, 2015

(51) Int. Cl.
*G02B 6/28* (2006.01)
(52) U.S. Cl.
CPC .................... *G02B 6/2808* (2013.01)
(58) Field of Classification Search
None
See application file for complete search history.

(56) References Cited

U.S. PATENT DOCUMENTS

| | | | |
|---|---|---|---|
| 3,756,688 A * | 9/1973 | Hudson et al. | 385/43 |
| 3,870,398 A * | 3/1975 | Love | G02B 6/2817 359/833 |
| 3,874,781 A * | 4/1975 | Thiel | G02B 6/2808 385/24 |
| 3,883,222 A | 5/1975 | Gunderson | |
| 3,901,581 A | 8/1975 | Thiel | |
| 3,936,141 A * | 2/1976 | Milton | G02B 6/2808 385/115 |

(Continued)

FOREIGN PATENT DOCUMENTS

| CN | 1456908 | 11/2003 |
|---|---|---|
| CN | 1547349 | 11/2004 |

(Continued)

OTHER PUBLICATIONS

European Patent Application No. 14179082.4; Extended Search Report; dated Dec. 22, 2014; 8 pages.

(Continued)

*Primary Examiner* — Andrew Jordan

(74) *Attorney, Agent, or Firm* — Gates & Cooper LLP

(57) ABSTRACT

An optical network architecture can include a first pair of tapered mixing rods and a second pair of tapered mixing rods. The optical network architecture can also include a first plurality of plastic optical fibers communicatively coupled from the first pair of tapered mixing rods to a first plurality of line replaceable units and a second plurality of plastic optical fibers communicatively coupled from the second pair of tapered mixing rods to a second plurality of line replaceable units. The optical network architecture can also include at least one plastic optical fiber communicatively coupled from the first pair of tapered mixing rods to the second pair of tapered mixing rods.

20 Claims, 18 Drawing Sheets

(56) References Cited

U.S. PATENT DOCUMENTS

| | | | |
|---|---|---|---|
| 4,072,399 A * | 2/1978 | Love | 385/46 |
| 4,092,059 A * | 5/1978 | Hawkes | G02B 6/2808 |
| | | | 385/46 |
| 4,387,441 A | 6/1983 | Kocol et al. | |
| 4,417,334 A | 11/1983 | Gunderson et al. | |
| 4,494,185 A | 1/1985 | Gunderson et al. | |
| 4,496,211 A * | 1/1985 | Daniel | G02B 6/262 |
| | | | 385/147 |
| 4,511,208 A * | 4/1985 | Ozeki et al. | 385/24 |
| 4,531,239 A | 7/1985 | Usui | |
| 4,583,161 A | 4/1986 | Gunderson et al. | |
| 4,707,062 A | 11/1987 | Abe et al. | |
| 4,708,424 A | 11/1987 | Marhic | |
| 4,783,850 A | 11/1988 | MacDonald et al. | |
| 4,824,200 A | 4/1989 | Isono et al. | |
| 4,826,275 A * | 5/1989 | Heinzman | 385/46 |
| 4,913,508 A * | 4/1990 | Blyler et al. | 385/50 |
| 4,915,489 A | 4/1990 | Byron et al. | |
| 4,948,218 A * | 8/1990 | Kobayashi et al. | 398/141 |
| 4,984,864 A * | 1/1991 | Blyler et al. | 385/46 |
| 5,035,480 A | 7/1991 | Dutt | |
| 5,243,680 A | 9/1993 | Soane | |
| 5,268,980 A | 12/1993 | Yuuki | |
| 5,271,079 A | 12/1993 | Levinson | |
| 5,282,257 A | 1/1994 | Ota | |
| 5,317,662 A | 5/1994 | Hotea | |
| 5,408,551 A | 4/1995 | Maria Van Woesik | |
| 5,510,920 A | 4/1996 | Ota | |
| 5,523,879 A | 6/1996 | Ota | |
| 5,570,226 A | 10/1996 | Ota | |
| 5,684,899 A | 11/1997 | Ota | |
| 5,773,345 A | 6/1998 | Ota | |
| 5,854,700 A | 12/1998 | Ota | |
| 5,915,054 A | 6/1999 | Ota | |
| 5,959,752 A | 9/1999 | Ota | |
| 5,970,191 A | 10/1999 | Oba et al. | |
| 5,991,478 A | 11/1999 | Lewis et al. | |
| 6,062,742 A * | 5/2000 | Yuuki | 385/88 |
| 6,104,849 A | 8/2000 | Lewis et al. | |
| 6,116,789 A * | 9/2000 | Mrakovich et al. | 385/59 |
| 6,181,853 B1 | 1/2001 | Wade | |
| 6,195,477 B1 * | 2/2001 | Denuto et al. | 385/15 |
| 6,212,315 B1 | 4/2001 | Doerr | |
| 6,697,874 B1 * | 2/2004 | Friden et al. | 709/240 |
| 6,921,920 B2 * | 7/2005 | Kazakevich | A61B 1/0607 |
| | | | 257/81 |
| 6,960,029 B2 | 11/2005 | Iijima et al. | |
| 7,345,312 B2 * | 3/2008 | Kazakevich | A61B 1/0607 |
| | | | 257/79 |
| 7,540,645 B2 * | 6/2009 | Kazakevich | A61B 1/0607 |
| | | | 257/13 |
| 7,959,338 B2 * | 6/2011 | Kazakevich | A61B 1/0607 |
| | | | 362/554 |
| 7,965,913 B2 * | 6/2011 | Chan et al. | 385/46 |
| 8,233,754 B2 | 7/2012 | Bohnert et al. | |
| 8,478,127 B2 * | 7/2013 | Chan et al. | 398/135 |
| 8,521,032 B2 | 8/2013 | Truong | |
| 8,545,077 B2 * | 10/2013 | Kazakevich | A61B 1/0607 |
| | | | 362/554 |
| 8,554,032 B2 * | 10/2013 | Koshinz et al. | 385/46 |
| 8,833,991 B2 | 9/2014 | Kishimoto et al. | |
| 8,899,845 B2 * | 12/2014 | Gallegos et al. | 385/81 |
| 9,116,282 B2 * | 8/2015 | Kazakevich | A61B 1/0607 |
| 9,778,419 B1 * | 10/2017 | Chan | H04B 10/2507 |
| 2003/0042493 A1 * | 3/2003 | Kazakevich | A61B 1/0607 |
| | | | 257/98 |
| 2003/0049012 A1 | 3/2003 | Iijima et al. | |
| 2003/0146748 A1 | 8/2003 | Duncan et al. | |
| 2005/0053335 A1 | 3/2005 | Wipiajewski et al. | |
| 2005/0276553 A1 * | 12/2005 | Kazakevich | A61B 1/0607 |
| | | | 385/115 |
| 2007/0019912 A1 | 1/2007 | Lutz | |
| 2007/0269166 A1 | 11/2007 | Brode et al. | |
| 2008/0112182 A1 * | 5/2008 | Kazakevich | A61B 1/0607 |
| | | | 362/551 |
| 2008/0130311 A1 * | 6/2008 | Kazakevich | A61B 1/0607 |
| | | | 362/553 |
| 2009/0257716 A1 * | 10/2009 | Chan et al. | 385/46 |
| 2010/0278478 A1 | 11/2010 | Kuo | |
| 2011/0205751 A1 * | 8/2011 | Kazakevich | A61B 1/0607 |
| | | | 362/554 |
| 2011/0243566 A1 * | 10/2011 | Truong | 398/116 |
| 2012/0219286 A1 | 8/2012 | De Langen et al. | |
| 2013/0148926 A1 * | 6/2013 | Koshinz et al. | 385/46 |
| 2014/0029290 A1 * | 1/2014 | Kazakevich | A61B 1/0607 |
| | | | 362/554 |
| 2014/0205245 A1 * | 7/2014 | Gallegos et al. | 385/81 |
| 2014/0218779 A1 | 8/2014 | Mukawa | |
| 2015/0036974 A1 * | 2/2015 | Chan et al. | 385/24 |
| 2015/0037046 A1 * | 2/2015 | Chan et al. | 398/175 |
| 2015/0346427 A1 * | 12/2015 | Kazakevich | A61B 1/0607 |
| | | | 362/553 |
| 2016/0085027 A1 * | 3/2016 | Chan | G02B 6/264 |
| | | | 385/24 |

FOREIGN PATENT DOCUMENTS

| | | |
|---|---|---|
| CN | 2661507 | 12/2004 |
| CN | 201682502 | 12/2010 |
| CN | 101958821 | 1/2011 |
| DE | 4112752 | 10/1992 |
| DE | 4112752 A1 | 10/1992 |
| EP | 0519712 | 6/1992 |
| EP | 1712940 | 10/2006 |
| JP | 2003-075651 A | 3/2003 |
| KR | 2011-0121305 A | 11/2011 |

OTHER PUBLICATIONS

Eric Y. Chan, et al., U.S. Appl. No. 13/954,557, entitled "Plastic and Glass Optical Fiber Bus Network", filed Jul. 30, 2013, Text Only.

Eric Y. Chan, et al., U.S. Appl. No. 13/954,705, entitled "Tapered Optical Mixing Rods", filed Jul. 30, 2013, Text Only.

http://www.specialtyphotonics.com/products/hcs_why.html "HCS® Optical Fibers for Industrial Communications: Why HCS?" OFS Fitel, LLC, © 2013, 3 pages.

http://ofscatalog.specialtyphotonics.com/item/al-fibers-and-cables-hcs-optical-fibers-and-cables/hcs-low-oh-high-numerical-aperture-0-43-na-fibers/item-10022&bc=0l1026. Item #CF05578-03, 400 HCS® Low OH High Numerical Aperture 0.43 NA Fibers, OFS Fitel, LLC, © 2013, 3 pages.

http://ofscatalog.specialtyphotonics.com/viewitems/al-fibers-and-cables-hcs-optical-fibers-and-cables/hcs-low-oh-0-37-na-fibers? HCS® Low OH 0.37 NA Fibers on OFS, Specialty Photonics Division, OFS Fitel, LLC, © 2013, 2 pages.

http://ofscatalog.specialtyphotonics.com/item/al-fibers-and-cables-hcs-optical-fibers-and-cables/hcs-high-oh-0-37-na-fibers/cf01493-20?&bc=0l1033 Item # CF01493-20, 400 HCS® High OH 0.37 NA Fibers on OFS, Specialty Photonics Division, OFS Fitel, LLC, © 2013, 3 pages.

http://ofscatalog.specialtyphotonics.com/item/al-fibers-and-cables-hcs-optical-fibers-and-cables/hcs-low-oh-0-37-na-fibers/cf01493-15?&bc=0l1032 Item # CF01493-15 1000 HCS® Low OH 0.37 NA Fibers on OFS, Specialty Photonics Division, OFS Fitel, LLC, © 2013, 3 pages.

Canada Patent Application No. 2,851,107; Office Action; dated Oct. 19, 2015; 5 pages.

Chinese Office Action (with English translation) dated Aug. 28, 2017 for Chinese Patent Application No. 201410369373.6.

Canadian Office Action dated Nov. 1, 2017 for Canadian Patent Application No. 2,851,107.

European Examination Report dated May 21, 2019 for European Patent Application No. 14179082.4.

Chinese Office Action (with English translation) dated Oct. 25, 2018 for Chinese Patent Application No. 2014103693736.

Canadian Office Action dated Oct. 9, 2018 for Canadian Patent Application No. 2,851,107.

(56) References Cited

OTHER PUBLICATIONS

Japanese Notice of Reasons for Rejection (with English translation) dated Oct. 2, 2018 for Japanese Patent Application No. 2014-151509.
Canadian Office Action dated Jul. 29, 2019 for Canadian Patent Appln No. 2,851,107.

* cited by examiner

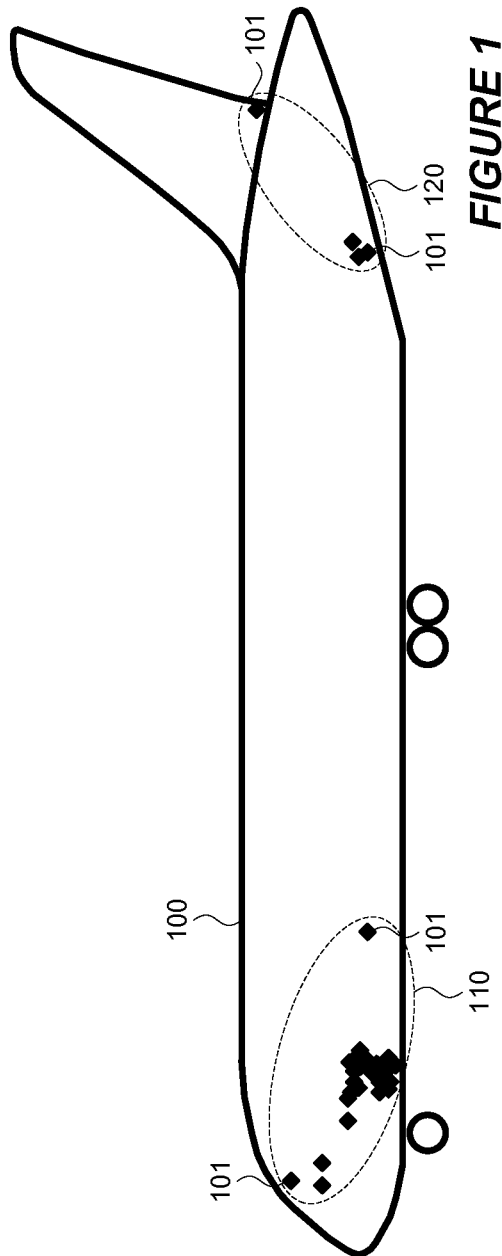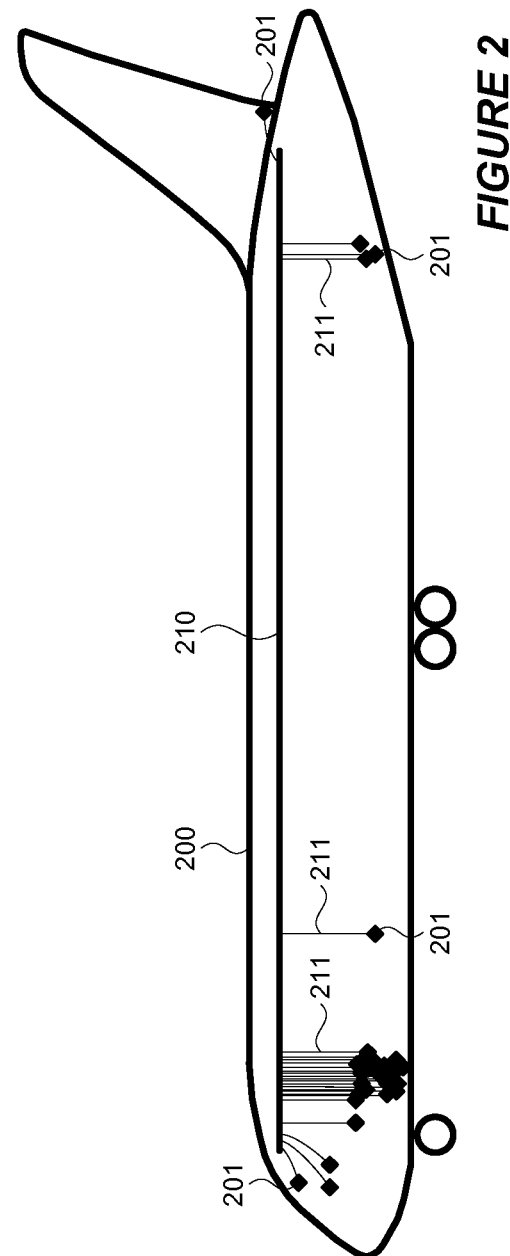

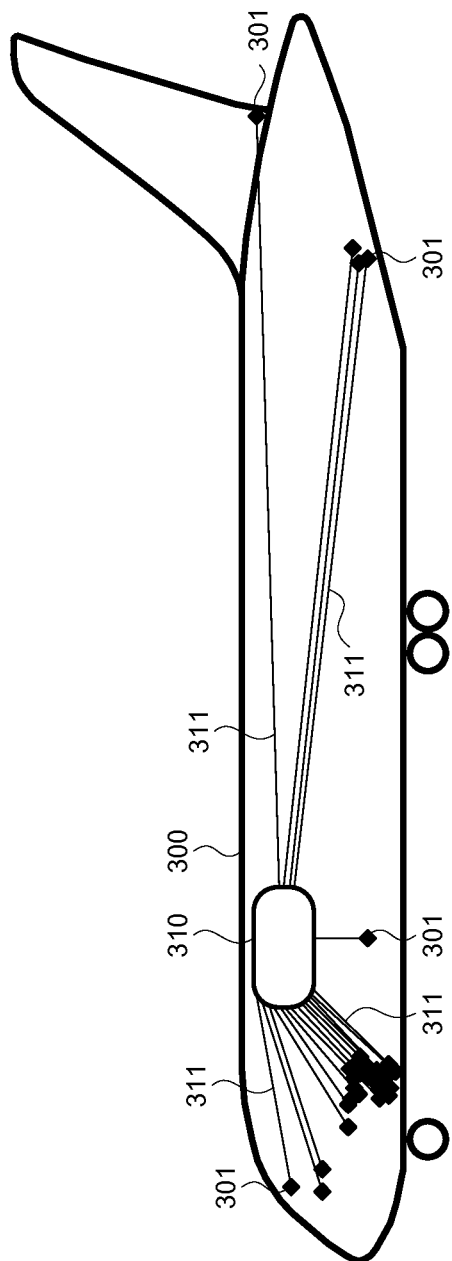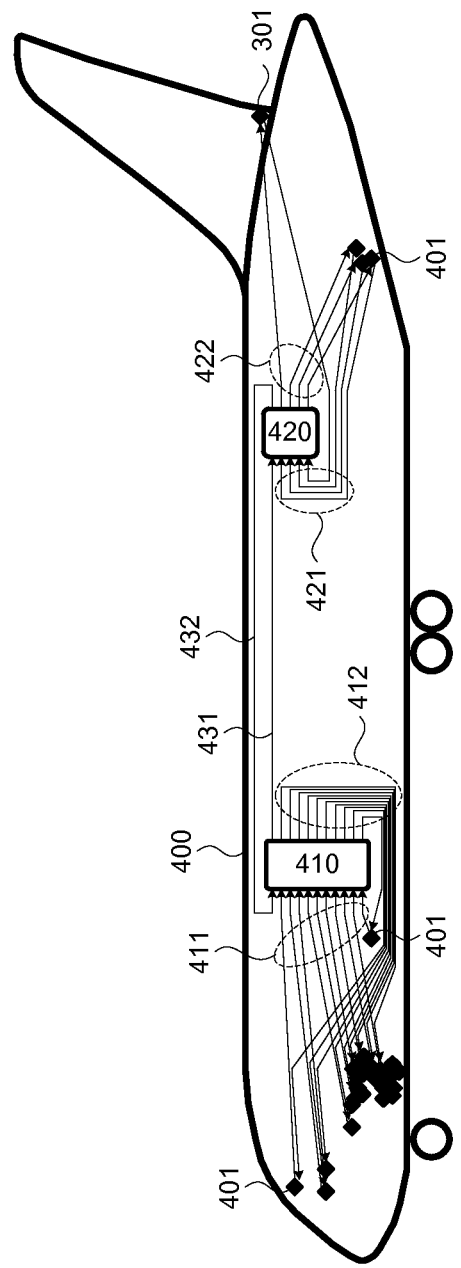

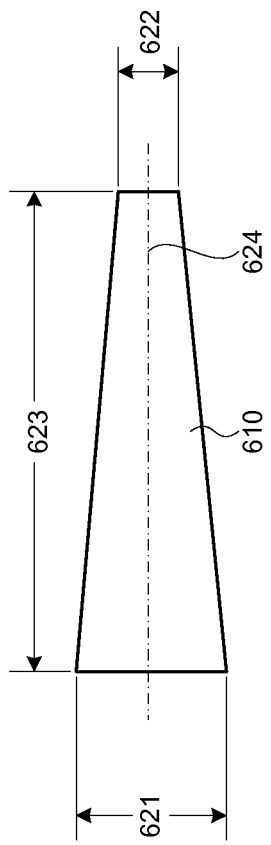
*FIGURE 6A*
*FIGURE 6B*
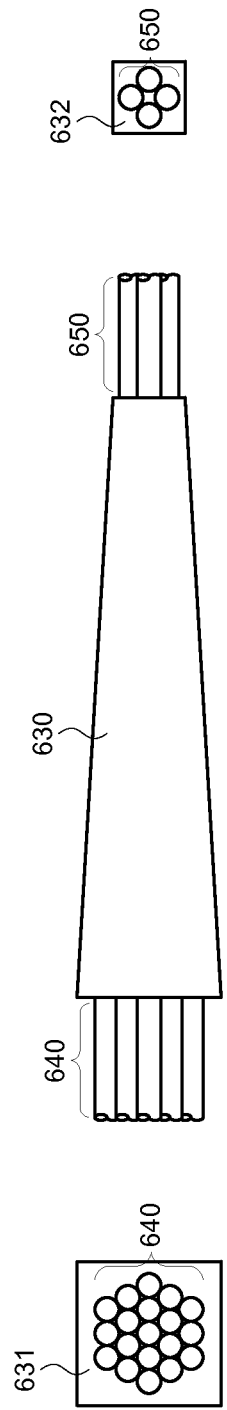
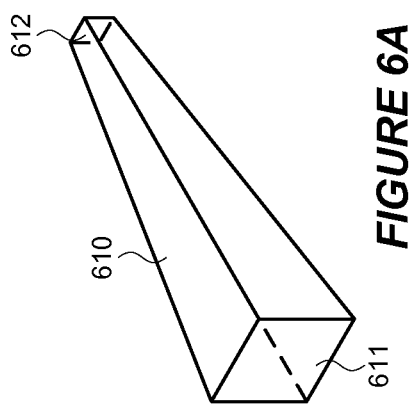
*FIGURE 6C*

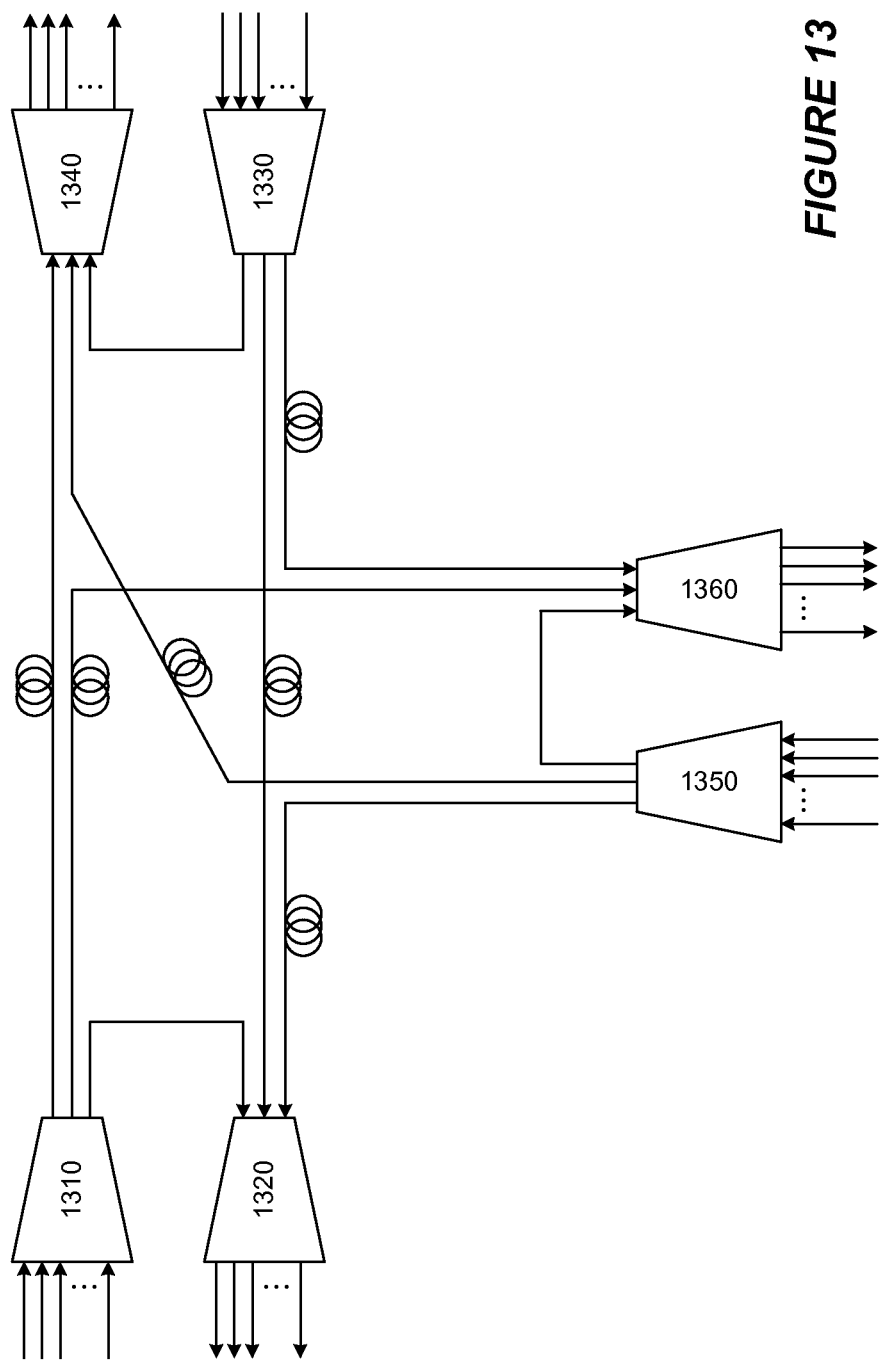

PLASTIC OPTICAL FIBER BUS NETWORK USING TAPERED MIXING RODS

CROSS REFERENCE TO RELATED APPLICATIONS

This application is related to U.S. application Ser. No. 13/954,557, entitled "PLASTIC AND GLASS OPTICAL FIBER BUS NETWORK," and to U.S. application Ser. No. 13/954,705, entitled "TAPERED OPTICAL MIXING RODS," filed on the same date as the present application, the contents of which are hereby incorporated by reference.

BACKGROUND

The present application is generally related to components and systems of optical communication buses.

Optical networking using plastic optical fibers (POF) may provide advantages over networking using copper or other metal wiring. Categories of plastic optical fiber include plastic clad silica (PCS) fiber, single core plastic optical fiber, or multi-core plastic optical fiber. Plastic optical fiber networking may have lower installation and maintenance costs. Moreover, because plastic optical fibers are lighter than metal wires that would be needed to carry an equivalent amount of data, using plastic optical fibers may result in appreciable weight savings. The weight savings may be significant for networks aboard vehicles, such as aircraft, where the weight savings may result in reduced fuel consumption and lower emissions.

In some scenarios, a number of line replaceable units (LRUs) may need to be connected to each other. For example, a number of line replaceable units at the front of a vehicle may need to be connected to a number of components at the back of a vehicle. Connecting each line replaceable unit to each other line replaceable unit may result in an unreasonably large number of connections between line replaceable units. Additionally, many of the connections between line replaceable units may be long, resulting in a number of long connections. If all of these connections are in the form of copper wires, the resulting space and weight of the connections alone may be burdensome for the vehicle. Electrical data buses have been used to connect line replaceable units. A single data bus can eliminate some of the weight and size of electrical connections between line replaceable units. In general, optical communication fibers, such as glass optical fibers (GOF) and plastic optical fibers, can be lighter and contained in smaller spaces than electrical wiring. However, implementing optical communication systems is not as simple as merely replacing all electric wiring with optical fibers.

Plastic optical fibers exhibit high transmission capacity, have excellent electromagnetic interference (EMI) noise immunity, are light weight, have high mechanical strength and have outstanding flexibility. Due to these properties, plastic optical fibers are used in data communications, as well as decoration, illumination, and similar industrial applications. Plastic optical fibers are also larger in diameter as compared to glass optical fibers. Due to its larger diameter, plastic optical fibers exhibit much greater tolerance to fiber misalignment than glass optical fibers. Because of this large misalignment tolerance, plastic optical fiber-based fiber optic networks have lower maintenance and installation costs. In aerospace platforms plastic optical fibers also greatly reduce the cost of connectors and transceiver components used in an avionics network.

Some optical communication components have been developed. For example, U.S. Pat. No. 7,965,913 describes an optical star rod that includes a hollow cylindrical holding tube for receiving plastic optical fibers (POF) at a front end of the holding tube and a mixing rod at a rear end of the holding tube. The rear end of each POF is affixed to a front surface of the mixing rod. A rear convex surface of the mixing rod is polished and coated with a highly reflective coating to form a convex reflective surface. However, U.S. Pat. No. 7,965,913 does not describe the use of a tapered mixing rod to convey signals from one number of input optical fibers to a different number of output optical fibers.

SUMMARY

Illustrative examples of the present disclosure include, without limitation, methods, structures, and systems. In one aspect, an optical network architecture can include a first pair of tapered mixing rods and a second pair of tapered mixing rods. The optical network architecture can also include a first plurality of plastic optical fibers communicatively coupled from the first pair of tapered mixing rods to a first plurality of line replaceable units and a second plurality of plastic optical fibers communicatively coupled from the second pair of tapered mixing rods to a second plurality of line replaceable units. The optical network architecture can also include at least one plastic optical fiber communicatively coupled from the first pair of tapered mixing rods to the second pair of tapered mixing rods.

In one example, a first end of the at least one plastic optical fiber can be coupled to one of the first pair of mixing rods. A second end of the at least one plastic optical fiber can be coupled to one of the second pair of mixing rods. In another example, the first pair of mixing rods comprises a first mixing rod and a second mixing rod, and wherein the second pair of mixing rods comprises a third mixing rod and a fourth mixing rod. A first plastic optical fiber can be communicatively coupled from the first mixing rod to the fourth mixing rod and a second plastic optical fiber can be communicatively coupled from the third mixing rod to the second mixing rod. A first optical repeater can be located on the first plastic optical fiber. The first optical repeater can be configured to increase a signal strength of optical signals propagating along the first optical fiber such that optical signal strengths received by the fourth mixing rod from the first optical fiber are within a predetermined range. A second optical repeater can be located on the second plastic optical fiber. The second optical repeater can be configured to increase a signal strength of optical signals propagating along the second optical fiber such that optical signal strength s received by the second mixing rod from the second optical fiber are within a predetermined range.

In another aspect, an optical network architecture can include a first tapered mixing rod configured to receive optical signals from a first plurality of plastic optical fibers communicatively coupled to a first plurality of line replaceable units and send optical signals along a first plastic optical fiber and a second plastic optical fiber. The optical network architecture can also include a second tapered mixing rod configured to receive optical signals from the second plastic optical fiber and a third plastic optical fiber and send optical signals via a second plurality of plastic optical fibers communicatively coupled to the first plurality of line replaceable units. The optical network architecture can also include a third tapered mixing rod configured to receive optical signals from a third plurality of plastic optical fibers communicatively coupled to a second plurality of line replaceable units and send optical signals along the third plastic optical fiber and a fourth plastic optical fiber. The optical network architecture can also include a fourth tapered mixing rod configured to receive optical signals from the first plastic optical fiber and the fourth plastic optical fiber and send optical signals via a fourth plurality of plastic optical fibers communicatively coupled to the second plurality of line replaceable units.

In one example, a first optical repeater can be located on the first plastic optical fiber and the first optical repeater can be configured to increase a strength of optical signals propagating along the first plastic optical fiber. A location of the first optical repeater and an increase in the strength of optical signals propagating along the first plastic optical fiber by the first optical repeater can be selected such that optical signals received by the fourth tapered mixing rod from the first plastic optical fiber are within a first predetermined range of optical signal strengths. A first optical attenuator can be located on the fourth plastic optical fiber, and the first optical attenuator can be configured to attenuate optical signals propagating along the fourth optical fiber such that a strength of optical signals received by the fourth tapered mixing rod from the fourth optical fiber are within the first predetermined range of optical signal strengths. A second optical repeater can be located on the third plastic optical fiber, and the second optical repeater can be configured to increase a strength of optical signals propagating along the third plastic optical fiber. A location of the second optical repeater and an increase in the strength of optical signals propagating along the third plastic optical fiber by the second optical repeater can be selected such that optical signals received by the second tapered mixing rod from the third plastic optical fiber are within a second predetermined range of optical signal strengths. A second optical attenuator can be located on the second plastic optical fiber, and the second optical attenuator can be configured to attenuate optical signals propagating along the second optical fiber such that a strength of optical signals received by the second tapered mixing rod from the second optical fiber are within the second predetermined range of optical signal strengths.

In another aspect, an aircraft optical network can include a first pair of tapered mixing rods located at a front end of the aircraft and a second pair of tapered mixing rods located at a back end of the aircraft. The aircraft network architecture can also include a first plurality of plastic optical fibers communicatively coupled from the first pair of tapered mixing rods to a first plurality of line replaceable units where the first plurality of line replaceable units are located at the front end of the aircraft. The aircraft network architecture can also include a second plurality of plastic optical fibers communicatively coupled from the second pair of tapered mixing rods to a second plurality of line replaceable units where the second plurality of line replaceable units are located at the back end of the aircraft. The aircraft network architecture can also include at least one plastic optical fiber communicatively coupled from one of the first pair of tapered mixing rods to one of the second pair of tapered mixing rods.

In one example, the at least one plastic optical fiber has a length in a range from 50 meters to 100 meters. At least one optical repeater can be located on the at least one plastic optical fiber, and the at least one optical repeater can be configured to increase a strength of optical signals propagating along the at least one plastic optical fiber. The first plurality of plastic optical fibers and the second plurality of plastic optical fibers can have lengths equal to or less than 20 meters.

Other features of the inventive system and method are described below. The features, functions, and advantages can be achieved independently in various embodiments or may be combined in yet other embodiments, further details of which can be seen with reference to the following description and drawings.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 1 depicts an example of a vehicle that has a number of line replaceable units.

FIG. 2 depicts an example of a vehicle that has a number of line replaceable units connected by an electrical bus.

FIG. 3 depicts a communication system that uses plastic fiber optics instead of an electrical bus to connect line replaceable units.

FIG. 4 depicts a vehicle with a number of line replaceable units connected via an optical network with two symmetrical optical star couplers.

FIGS. 6A-6C depict examples of tapered mixing rods that can be used in optical networks.

FIG. 13 depicts an example of an optical network with three pairs of mixing rods.

DETAILED DESCRIPTION OF ILLUSTRATIVE EMBODIMENTS

Figure 5:
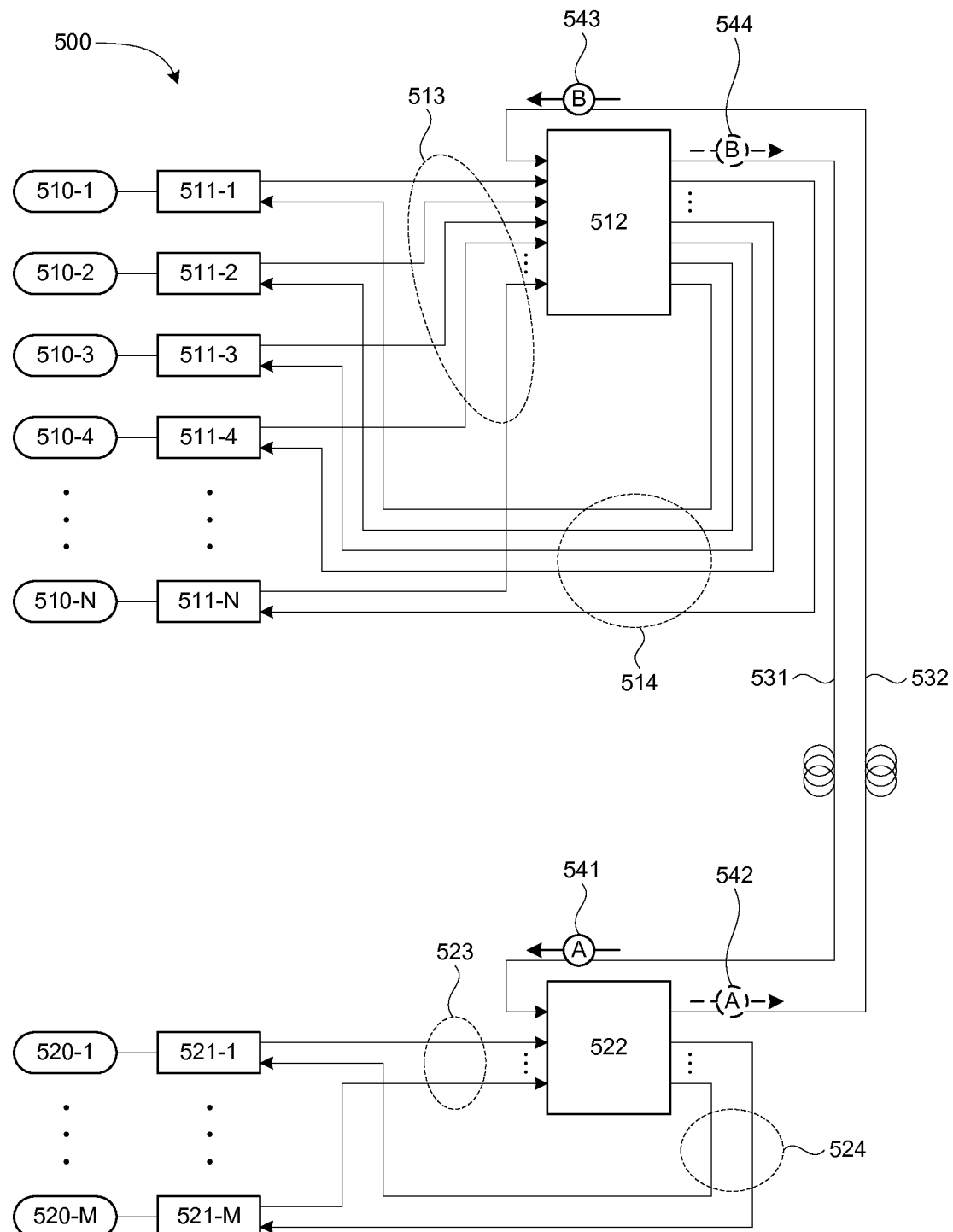
FIG. 5 depicts a schematic of a dual symmetrical star coupler optical network.

Implementing optical communication systems is not as simple as merely replacing all electric wiring with optical fibers. FIG. 1 depicts an example of a vehicle 100 that has a number of line replaceable units 101. For ease of depiction, not all of the line replaceable units 101 have been labeled. In the particular example shown in FIG. 1, the vehicle 100 can be in the form of an airplane. The vehicle could also be in any other form, such as a car, a boat, a train, or any other type of vehicle. Moreover, implementation of the systems described herein are not limited solely to the environment of a vehicle; a vehicle is used here for illustrative purposes only.

Individual ones of the line replaceable units 101 can be any component that sends and receives signals from other components. For example, line replaceable units 101 can include sensor components, flight control components, and the like. Within the vehicle 100 depicted in FIG. 1, the vehicle 100 includes a first grouping 110 of line replaceable units 101 and a second grouping 120 of line replaceable units 101. In one example, the first grouping 110 can include thirty seven line replaceable units 101 and the second grouping 120 can include four line replaceable units 101. In order for all forty one of line replaceable units 101 to be in communication with each other, a single connection can be placed between each set of two line replaceable units 101. However, providing a single connection between each set of two line replaceable units 101 would require separate connections. Moreover, a number of connections would need to span the distance between the first grouping 110 of line replaceable units 101 and the second grouping 120 of line replaceable units 101 to connect one of the first grouping 110 of line replaceable units 101 and one of the second grouping 120 of line replaceable units 101. Such a large number and length of individual connections would add significant weight and size to the vehicle 100 and would add significant complexity to assembling the vehicle 100.

One solution to connecting line replaceable units is to use an electrical system that connects the line replaceable units using an electrical bus. FIG. 2 depicts an example of a vehicle 200 that has a number of line replaceable units 201. For ease of depiction, not all of the line replaceable units 201 have been labeled. The vehicle 200 also includes an electrical bus 210 that runs from the front of the vehicle 200 to the back of the vehicle 200. The line replaceable units 201 are connected to the bus 210 via stub cables and current mode couplers 211. For ease of depiction, not all of the stub cables and current mode couplers 211 have been labeled. In this manner, any data sent from one of the line replaceable units 201 to the bus 210 will be received by the remaining line replaceable units 201. While this solution may have fewer connections than a system where each set of two of the line replaceable units 201 are directly connected to each other, the copper required to implement such a system has weight that can affect the performance of the vehicle 200. In the case where the vehicle is an airplane, the weight of the electrical connections can affect the fuel efficiency of the airplane, the passenger and cargo capacities of the airplane, and so forth.

FIG. 3 depicts a communication system that uses plastic fiber optics instead of an electrical bus. Depicted in FIG. 3 is a vehicle 300 with line replaceable units 301. For ease of depiction, not all of the line replaceable units 301 have been labeled. The vehicle also includes an optical star coupler 310. The line replaceable units 301 are connected to optical star coupler 310 via optical fibers 311, such as plastic optical fibers. For ease of depiction, not all of the optical fibers 311 have been labeled. The optical star coupler 310 can be configured to receive optical signals from each of the optical fibers 311 and to transmit a combined optical signal, representing the combination of all of the optical signals received from each of the optical fibers 311, back to the line replaceable units 301 via the optical fibers 311. In this manner, the signals sent by each of the line replaceable units 301 are received by all of the other line replaceable units 301.

One challenge with the system depicted in FIG. 3 is the possible long distance of some of the optical fibers 311. For instance, one of the line replaceable units 301 near the rear of the vehicle 300 can be about 70 meters away from the optical star coupler 310. This means that an optical signal would travel about 140 meters round trip from the source line replaceable unit to the optical star coupler 310 and back to the source line replaceable unit. Optical signal delay can be about 5 ns/meter in plastic optical fibers. With a round trip of 140 meters, the optical fibers 311 themselves can introduce a delay of about 700 ns on a round trip optical signal. Some line replaceable units 301 may send a "self test" data pattern to test connections to a data bus. For example, a line replaceable unit may send a self test data pattern to data bus and determine how long it takes for the line replaceable unit to see the self test data pattern. If the self test data pattern is not received within a certain amount of time, such as within 500 ns, the line replaceable unit may switch to a "receiver only" mode in which the line replaceable unit will receive any data coming from the bus, but will not write any data on the bus. In the case where the length of optical fibers 311 causes 700 ns of delay and the line replaceable units 301 expect a self test data pattern to be read within 500 ns, the optical fibers 311 will not be compatible with the system requirements.

One way to overcome the optical signal delays described with respect to the system in FIG. 3 is a dual symmetrical star coupler optical network. FIG. 4 depicts a vehicle 400 with a number of line replaceable units 401. For ease of depiction, not all of the line replaceable units 401 have been labeled. The vehicle includes a first symmetrical star coupler 410 and a second symmetrical star coupler 420. The system includes plastic optical fiber transmission lines 411 from each of the line replaceable units 401 in the front of the vehicle 400 to the first symmetrical star coupler 410. The plastic optical fiber transmission lines 411 are configured to carry optical signals transmitted from the line replaceable units 401 in the front of the vehicle 400 to the first symmetrical star coupler 410. The system also includes plastic optical fiber receiving lines 412 connecting the first symmetrical star coupler 410 back to each of the line replaceable units 401 in the front of the vehicle 400. The plastic optical fiber receiving lines 412 are configured to carry optical signals from the first symmetrical star coupler 410 back to each of the line replaceable units 401 in the front of the vehicle 400. The system includes plastic optical fiber transmission lines 421 from each of the line replaceable units 401 in the back of the vehicle 400 to the second symmetrical star coupler 420. The plastic optical fiber transmission lines 421 are configured to carry optical signals transmitted from the line replaceable units 401 in the back of the vehicle 400 to the second symmetrical star coupler 420. The system also includes plastic optical fiber receiving lines 422 connecting the second symmetrical star coupler 420 back to each of the line replaceable units 401 in the back of the vehicle 400. The plastic optical fiber receiving lines 422 are configured to carry optical signals from the second symmetrical star coupler 420 back to each of the line replaceable units 401 in the back of the vehicle 400. The system also includes a first long optical fiber transmission line 431 and a second long optical fiber transmission line 432. The first long optical fiber transmission line 431 is configured to transmit optical signals from the first symmetrical star coupler 410 to the second symmetrical star coupler 420. The second long optical fiber transmission line 432 is configured to transmit optical signals from the second symmetrical star coupler 420 to the first symmetrical star coupler 410.

In operation each of the first symmetrical star coupler 410 and the second symmetrical star coupler 420 is configured to receive optical signals from a predetermined number of optical inputs and to transmit all of the optical signals received from the optical inputs onto each of the same predetermined number of optical outputs. For example, in the case where vehicle 400 includes thirty seven line replaceable units 401 at the front of the vehicle 400, the first symmetrical star coupler 410 can be configured to receive thirty eight optical inputs and output thirty eight optical outputs. The thirty eight optical inputs include the thirty seven plastic optical fiber transmission lines 411 and the one second plastic optical fiber transmission line 432. The thirty eight optical outputs include the thirty seven plastic optical fiber receiving lines 412 and the one first long optical fiber transmission line 431. The first symmetrical star coupler 410 is configured to receive optical signals from the thirty eight optical inputs and output the combination of the thirty eight optical inputs onto each of the thirty eight optical outputs. In the case where vehicle 400 includes four line replaceable units 401 at the back of the vehicle 400, the second symmetrical star coupler 420 can be configured to receive five optical inputs and output five optical outputs. The five optical inputs include the four plastic optical fiber transmission lines 421 and the one first long optical fiber transmission line 431. The thirty eight optical outputs include the four plastic optical fiber receiving lines 422 and the one second long optical fiber transmission line 432. The second symmetrical star coupler 420 is configured to receive optical signals from the five optical inputs and output the combination of the five optical inputs onto each of the five optical outputs.

In the system depicted in FIG. 4, the optical signals sent from each line replaceable unit will be transmitted to all of the line replaceable units 401. In one example, one of the line replaceable units 401 in the front of the vehicle 400 sends an optical signal via one of the plastic optical fiber transmission lines 411. The first symmetrical star coupler 410 transmits the optical signal to each of plastic optical fiber receiving lines 412 back to all of the line replaceable units 401 in the font of the vehicle 400. The first symmetrical star coupler 410 also transmits the optical signal along first long optical fiber transmission line 431 to the second symmetrical star coupler 420. The second symmetrical star coupler 420 transmits the optical signal to each of plastic optical fiber receiving lines 422 to all of the line replaceable units 401 in the back of the vehicle 400. Signals sent by the line replaceable units 401 in the back of the vehicle 400 are similarly transmitted to all of the line replaceable units 401.

FIG. 5 depicts a schematic of a dual symmetrical star coupler optical network 500. The optical network 500 includes a first plurality of line replaceable units 510, including N line replaceable unit 510-1 through 510-N. The system also includes a first plurality of optical-electrical media converters 511, including N line optical-electrical media converters 511-1 through 511-N, with one of the first plurality of optical-electrical media converters 511 corresponding to one of the first plurality of line replaceable units 510. The first plurality of optical-electrical media converters 511 convert electrical signals sent by the first plurality of line replaceable units 510 into optical signals, and convert optical signals into electrical signals sent to the first plurality of line replaceable units 510. Optical signals sent out of the first plurality of optical-electrical media converters 511 are sent to a first symmetrical star coupler 512 via plastic optical fibers 513. Optical signals sent out of the first symmetrical star coupler 512 are returned to the first plurality of optical-electrical media converters 511 via plastic optical fibers 514. The optical network 500 also includes a second plurality of line replaceable units 520, including M line replaceable unit 520-1 through 520-M. The system also includes a second plurality of optical-electrical media converters 521, including M line optical-electrical media converters 521-1 through 521-M, with one of the second plurality of optical-electrical media converters 521 corresponding to one of the second plurality of line replaceable units 520. The second plurality of optical-electrical media converters 521 convert electrical signals sent by the second plurality of line replaceable units 520 into optical signals, and convert optical signals into electrical signals sent to the second plurality of line replaceable units 520. Optical signals sent out of the second plurality of optical-electrical media converters 521 are sent to a second symmetrical star coupler 522 via plastic optical fibers 523. Optical signals sent out of the second symmetrical star coupler 522 are returned to the second plurality of optical-electrical media converters 521 via plastic optical fibers 524. The optical network 500 also includes a first long transmission optical fiber 531 and a second long transmission optical fiber 532. The first long transmission optical fiber 531 is configured to transmit optical signals from the first symmetrical star coupler 512 to the second symmetrical star coupler 522. The second transmission optical fiber 532 is configured to transmit optical signals from the second symmetrical star coupler 522 to the first symmetrical star coupler 512.

Systems using dual symmetrical star couplers have a number of characteristics. In one example, for the system to operate properly, the receivers in the optical-electrical media converters need to have very high instantaneous dynamic range to detect a weak signal after a strong signal is received. This instantaneous dynamic range can span over 39 dB is some instances. In another example, optical signals can be echoed when transmitted between the two stars couplers. In the optical network 500 depicted in FIG. 5, an optical transmission 541 is sent from the first symmetrical star coupler 512 to the second symmetrical star coupler 522 via first transmission optical fiber 531. Since the first long transmission optical fiber 531 is one of the optical inputs into the second symmetrical star coupler 522, the second symmetrical star coupler 522 outputs the same optical transmission on each of the optical outputs, including the second transmission optical fiber 532. An echo optical transmission 542 of optical transmission 541 is sent along the second long transmission optical fiber 532 back to the first symmetrical star coupler 512. The echo optical transmission 542 can cause errors in the plurality of line replaceable units 510 and the plurality of line replaceable units 520 as the original optical transmission 541 was not intended to be retransmitted back to the first symmetrical star coupler 512. Similarly, an optical transmission 543 can be sent along the second long transmission optical fiber 532 to the first symmetrical star coupler 512, and the first symmetrical star coupler 512 can send an echo optical transmission 544 back to the second symmetrical star coupler 522 via the first long transmission optical fiber 531.

The problem of echoing optical signals can be addressed by using a pair of tapered mixing rods in place of each of the symmetrical star couplers in the previously-described systems. FIGS. 6A to 6C depict examples of tapered mixing rods. FIGS. 6A and 6B depict an isometric and side view, respectively, of an example mixing rod 610. The mixing rod 610 can include a first face 611 and a second face 612. The size 621 of the first face 611 can be based on a number of optical fibers to be connected to the first face 611. The size 622 of the second face 612 can be based on a number of optical fibers to be connected to the second face 612. If the number of optical fibers to be connected to the first face 611 is different than the number of optical fibers to be connected to the second face 612, then the size of the first face 611 and the size of the second face 612 can be different giving the mixing rod 610 a tapered shape. The length 623 of the mixing rod 610 can be based on the sizes 621 and 622 of the faces 611 and 612. Each of the faces 611 and 612 can be substantially centered about an axis 624 that is substantially perpendicular to each of the two faces 611 and 612. The mixing rod 610 can be made from optical glass, optical plastic, or any other optically-transmissive material.

FIG. 6C depicts an example of a mixing rod 630 with a first set of optical fibers 640 attached to a first face 631 of the mixing rod 630 and a second set of optical fibers 650 attached to a second face 632 of the mixing rod 630. The sizes of the faces 631 and 632 and the length of the mixing rod 630 can be determined such that light from an optical signal entering from any one of the first set of optical fibers 640 will be distributed substantially uniformly across the second face 632 and such that light from an optical signal entering from any one of the second set of optical fibers 650 will be distributed substantially uniformly across the first face 631. In this manner, when an optical signal enters one face of the mixing rod 630 from an optical fiber, the same optical signal is transmitted across all of the optical fibers attached to the opposite face of the mixing rod.

In one example, the first set of optical fibers 640 can include between seven and forty optical fibers. In another example, the second set of optical fibers 650 can include between two and four optical fibers. In another example, the mixing rod 630 can be made of a BK7 glass rod or other highly-transmissive material with a trapezoidal shape. The first and second set of optical fibers 640 and 650 can be aligned to the respective faces 631 and 632 of the mixing rod 630 to optimize coupling. After alignment, the first and second set of optical fibers 640 and 650 can be attached to the respective faces 631 and 632 of the mixing rod 630 with an index matching UV adhesive. The completed assembly of optical fibers 640 and 650 and mixing rod 630 can be packaged in a protective housing. A multi-termini connector can used to mate the fibers inside the packaged protective housing with external optical fibers.

Figure 7A:
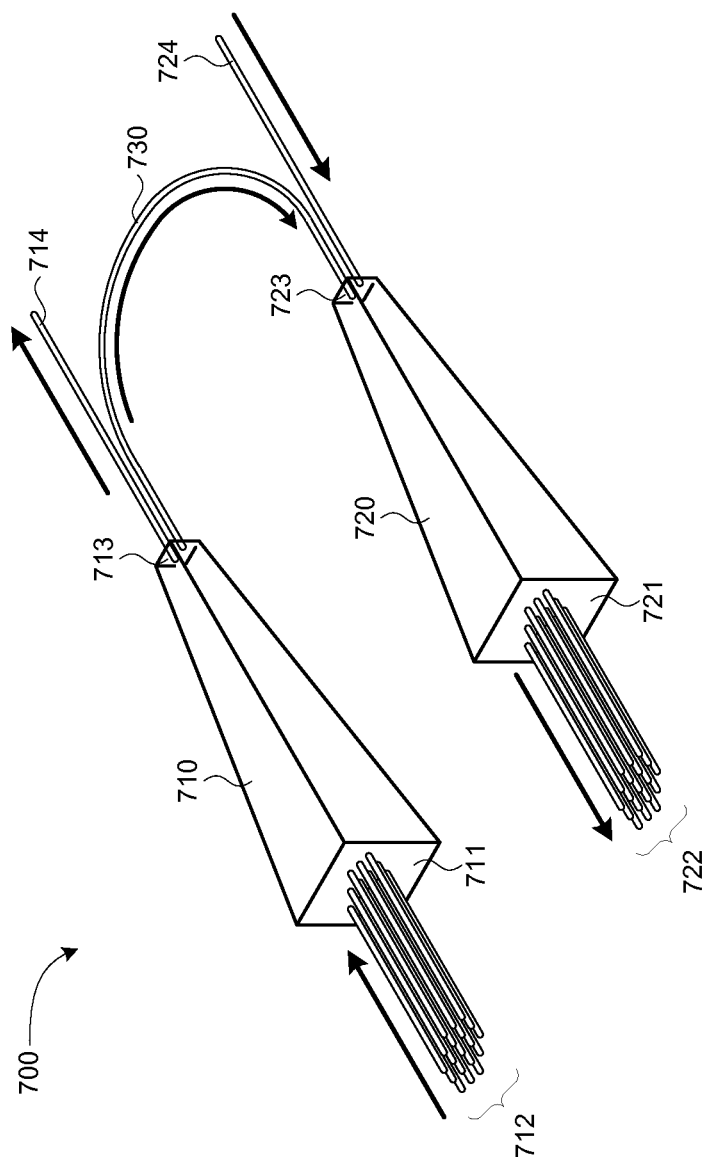
FIGS. 7A and 7B depict examples of a system with a pair of mixing rods.
Figure 7B:
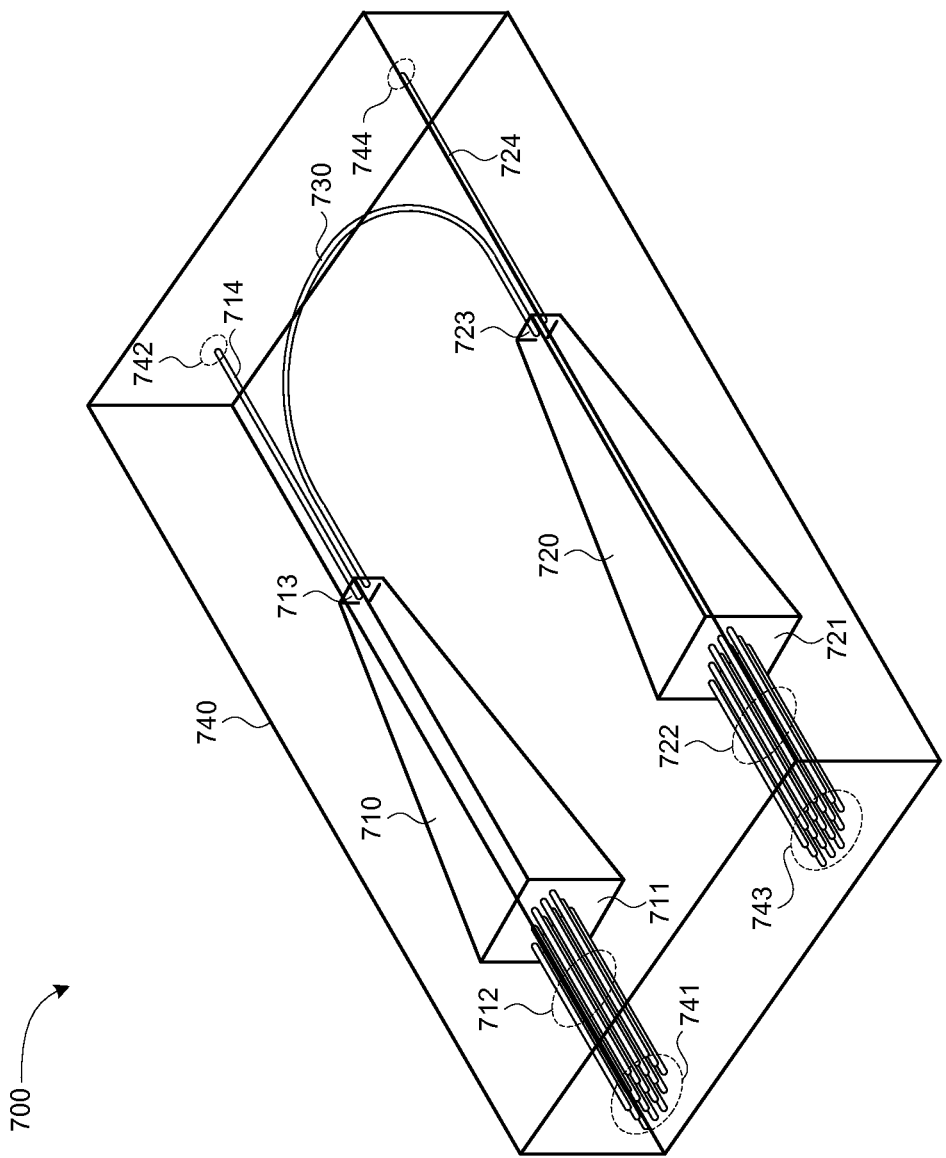

FIG. 7A depicts an example of a system 700 with a pair of mixing rods 710 and 720. Mixing rod 710 includes a first face 711. A first set of optical fibers 712 can be attached to the first face 711. The mixing rod 710 also includes a second face 713. Optical fibers 714 and 730 can be attached to the second face 713. Mixing rod 720 includes a first face 721. A second set of optical fibers 722 can be attached to the first face 721. The mixing rod 720 also includes a second face 723. Optical fibers 724 and 730 can be attached to the second face 723.

Each of the first set of optical fibers 712 can receive an optical signal transmitted from a line replaceable unit of a plurality of line replaceable units. The mixing rod 710 can uniformly distribute light from the optical signals received from the first set of optical fibers 712 across the second face 713 such that optical signals transmitted across optical fibers 714 and 730 is a combination of all of the optical signals received from the first set of optical fibers 712. The optical fibers 714 can be connected to one of another pair of mixing rods (not shown). The optical fiber 730 can transmit the combination of all of the optical signals received from the first set of optical fibers 712 to the second face 723 of mixing rod 720. Optical fiber 724 can also carry an optical signal from one of the other pair of mixing rods (not shown). The mixing rod 720 can uniformly distribute light from the optical signals received from optical fibers 724 and 730 across the first face 721 such that optical signals transmitted across the second set of optical fibers 722 is a combination of all of the optical signals received from optical fibers 724 and 730. Each of the second set of optical fibers 722 can transmit the optical signal from the mixing rod 720 to a line replaceable unit of the plurality of line replaceable units. One effect of using the pair of mixing rods 710 and 720 in place of a single symmetrical optical star coupler is that an optical signal received via optical fiber 724 is not echoed back across optical fiber 714.

FIG. 7A depicts an example of the system 700 including a single housing 740. The single housing 740 can have areas 741, 742, 743, and 744 for input of the first set of optical fibers 712, output of the and the optical fiber 714, output of the second set of optical fibers 722, and input of the optical fiber 724, respectively. Each of the areas 741, 742, 743, and 744 can include an optical connector configured to allow the inputs and outputs from the single housing 740 to be connected to external fibers. An optical connector for optical fibers 712 can be located in the area 741 on one side of the single housing 741 and an optical connector for optical fibers 722 can be located in the area 743 on the same side of the housing. Similarly, an optical connector for optical fiber 742 can be located in the area 742 on an opposite side of the single housing 741 and an optical connector for optical fiber 724 can be located in the area 744 on the same opposite side of the housing. Placing optical connectors on opposite sides of the single housing can facilitate physical connection of optical-electrical media converters in a data bus system. The single housing 740 can have a particular form based on the situation in which the single housing 740 is to be installed. The single housing 740 could be used as a direct replacement for a symmetrical optical star coupler.

A number of benefits exist to using a tapered mixing rod over a symmetrical optical star coupler. For example, the insertion loss of a tapered mixing rod can be lower than the insertion loss of symmetrical optical star coupler. In another example, the uniformity of light mixed in a tapered mixing rod can be much better than in a symmetrical optical star coupler. The tapered mixing rod can be easier to fabricate than a symmetrical optical star coupler because the tapered mixing rod has one side that is smaller than the other side.

Figure 8:
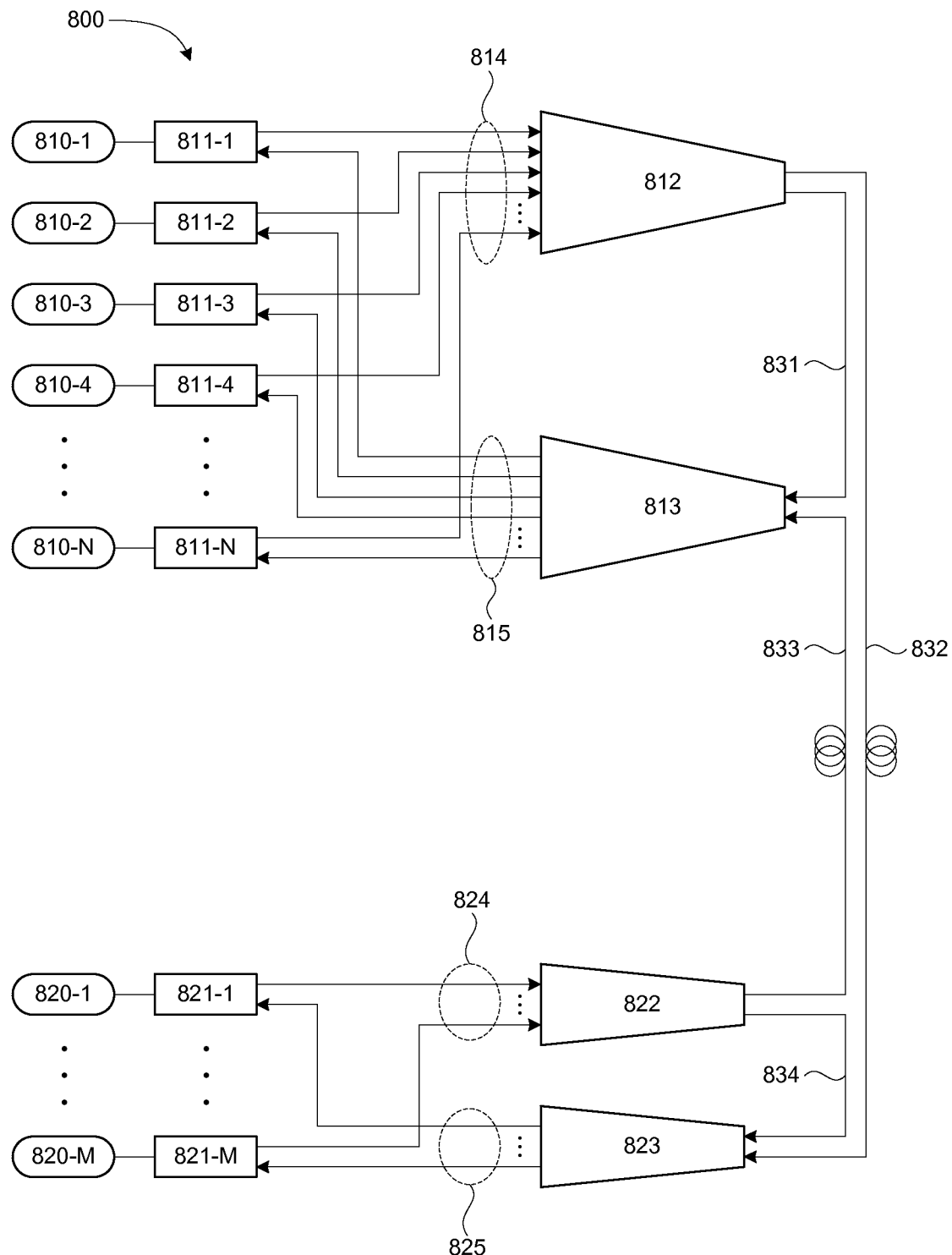
FIG. 8 depicts a schematic of an optical network that includes two pairs of tapered mixing rods.

FIG. 8 depicts a schematic of an optical network 800 that includes two pairs of tapered mixing rods. The optical network 800 includes a first plurality of line replaceable units 810, including N line replaceable unit 810-1 through 810-N. The system also includes a first plurality of optical-electrical media converters 811, including N line optical-electrical media converters 811-1 through 811-N, with one of the first plurality of optical-electrical media converters 811 corresponding to one of the first plurality of line replaceable units 810. The first plurality of optical-electrical media converters 811 convert electrical signals sent by the first plurality of line replaceable units 810 into optical signals, and convert optical signals sent to the first plurality of line replaceable units 810 into electrical signals. Optical signals sent out of the first plurality of optical-electrical media converters 811 are sent to a first mixing rod 812 via plastic optical fibers 814. The optical network 800 also includes a second mixing rod 813 connected to the first plurality of optical-electrical media converters 811 via plastic optical fibers 815. The plastic optical fibers 815 are configured to transmit optical signals from the second mixing rod 813 to the first plurality of optical-electrical media converters 811.

The optical network 800 includes a second plurality of line replaceable units 820, including M line replaceable unit 820-1 through 820-M. The system also includes a second plurality of optical-electrical media converters 821, including M line optical-electrical media converters 821-1 through 821-N, with one of the second plurality of optical-electrical media converters 821 corresponding to one of the second plurality of line replaceable units 820. The second plurality of optical-electrical media converters 821 convert electrical signals sent by the second plurality of line replaceable units 820 into optical signals, and convert optical signals sent to the second plurality of line replaceable units 820 into electrical signals. Optical signals sent out of the second plurality of optical-electrical media converters 821 are sent to a third mixing rod 822 via optical fibers 824. The optical network 800 also includes a fourth mixing rod 823 connected to the second plurality of optical-electrical media converters 821 via optical fibers 825. The optical fibers 825 are configured to transmit optical signals from the fourth mixing rod 823 to the second plurality of optical-electrical media converters 821.

The optical network 800 also includes optical fibers 831, 832, 833, and 834. The optical fiber 831 is connected to the smaller ends of each of the first mixing rod 812 and the second mixing rod 813. The optical fiber 831 is configured to transmit optical signals received from the first mixing rod 812 to the second mixing rod 813. The optical fiber 832 is connected to the smaller ends of each of the first mixing rod 812 and the fourth mixing rod 823. The optical fiber 832 is configured to transmit optical signals received from the first mixing rod 812 to the fourth mixing rod 823. The optical fiber 833 is connected to the smaller ends of each of the second mixing rod 813 and the third mixing rod 822. The optical fiber 833 is configured to transmit optical signals received from the third mixing rod 822 to the second mixing rod 813. The optical fiber 834 is connected to the smaller ends of each of the third mixing rod 822 and the fourth mixing rod 823. The optical fiber 834 is configured to transmit optical signals received from the third mixing rod 822 to the fourth mixing rod 823. The first and second mixing rods 812 and 813 are configured to be connected to N optical fibers on one end and to two optical fibers on the other end. Such mixing rods can be referred to as 2×N mixing rods. The third and fourth mixing rods 822 and 823 are configured to be connected to M optical fibers on one end and to two optical fibers on the other end. Such mixing rods can be referred to as 2×M mixing rods.

In the optical network depicted in FIG. 8, each signal sent by one of the first plurality of line replaceable units 810 and each signal sent by one of the second plurality of line replaceable units 820 is received by all of the line replaceable units of the first and second plurality of line replaceable units 810 and 820. In one example, a signal sent by one of the first plurality of line replaceable units 810 is sent as an electrical signal to one of the first plurality of optical-electrical media converters 811, converted to an optical signal, and sent to the first mixing rod 812 via one of the optical fibers 814. From the first mixing rod 812, the optical signal is sent via optical fiber 831 and optical fiber 832. The second mixing rod 813 receives the optical signal via optical fiber 831 and sends the optical signal along each of the optical fibers 815 to the first plurality of optical-electrical media converters 811. The optical signals are converted into electrical signals and sent to each of the first plurality of line replaceable units 810. The fourth mixing rod 823 receives the optical signal via optical fiber 832 and sends the optical signal along each of the optical fibers 825 to the second plurality of optical-electrical media converters 821. The optical signals are converted into electrical signals and sent to each of the second plurality of line replaceable units 820. In a similar example, a signal sent by one of the second plurality of line replaceable units 820 is sent as an electrical signal to one of the second plurality of optical-electrical media converters 821, converted to an optical signal, and sent to the third mixing rod 822 via one of the optical fibers 824. From the third mixing rod 822, the optical signal is sent via optical fiber 833 and optical fiber 834. The fourth mixing rod 823 receives the optical signal via optical fiber 834 and sends the optical signal along each of the optical fibers 825 to the second plurality of optical-electrical media converters 821. The optical signals are converted into electrical signals and sent to each of the second plurality of line replaceable units 820. The second mixing rod 813 receives the optical signal via optical fiber 833 and sends the optical signal along each of the optical fibers 815 to the first plurality of optical-electrical media converters 811. The optical signals are converted into electrical signals and sent to each of the first plurality of line replaceable units 810.

All of the optical fibers depicted in optical network 800, including optical fibers 814, 815, 824, 825, and 831-834 can be plastic optical fibers or glass optical fibers. The optical network 800 can be used in vehicle 100 depicted in FIG. 1 to connect line replaceable units 101. The pair of mixing rods 812 and 813 can be placed near the front of the vehicle such that the lengths of optical fibers 814 and 815 connecting the line replaceable units 101 in the front of the vehicle 100 to the pair of mixing rods 812 and 813 are minimized. For example, the pair of mixing rods 812 and 813 can be placed such that the lengths of optical fibers 814 and 815 are not longer than about 10 meters. The pair of mixing rods 822 and 823 can be placed hear the back of the vehicle 100 such that the lengths of optical fibers 824 and 825 connecting the line replaceable units 101 in the back of the vehicle 100 to the pair of mixing rods 822 and 823 are minimized. For example, the pair of mixing rods 822 and 823 can be placed such that the lengths of optical fibers 824 and 825 are not longer than about 20 meters. In such a case, the length of the optical fibers 832 and 833 may be longer that the lengths of optical fibers 814, 815, 824, and 825. For example, the lengths of optical fibers 832 and 833 may be in a range of about 50 meters to about 100 meters. In one example the lengths of optical fibers 814, 815, 824, and 825 can be less than or equal to 18 meters and the lengths of optical fibers 832 and 833 can be less than or equal to 70 meters. In this example, the distance between any two line replaceable units 101 would be no longer than 90 meters. Having a maximum length of plastic optical fiber between any two line replaceable units 101 can ensure that the delay of an optical signal caused by the plastic optical fiber between any two line replaceable units 101 is within an acceptable range of delay.

One challenge with the optical network 800 depicted in FIG. 8 is that the strength of the optical signals transmitted along the optical fibers 814, 815, 824, 825, 832, and 833 may vary depending on the length that each signal has traveled. For example, the length of optical fiber 831 may be significantly less than the length of optical fiber 833. In this example, the strength of the optical signal received by the second mixing rod 813 from optical fiber 831 may be significantly stronger than the strength of the optical signal received by the second mixing rod 813 from optical fiber 833. Such a variation in signal strength may require the receivers in the optical-electrical media converters 811 connected to the second mixing rod 813 to have a very high instantaneous dynamic range for the optical signals received. As discussed in greater detail below, the range of optical signal strengths received by the various components of the optical networks can be narrowed by one or more of employing optical repeaters, employing optical attenuators, and varying materials of the optical fibers.

Figure 9:
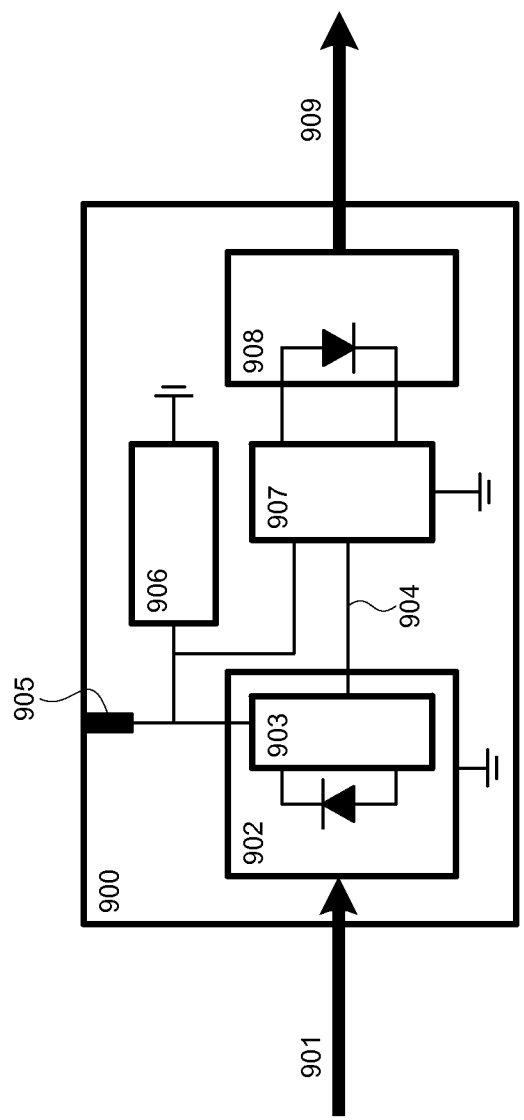
FIG. 9 depicts an example of an optical repeater.

FIG. 9 depicts an example of an optical repeater 900. The optical repeater 900 can include an input optical fiber 901 that is configured to carry an optical signal into the optical repeater 900. The optical signal can be received by a detector 902 that includes a burst mode receiver ASIC 903 configured to create an electrical signal 904 based on the optical signal detected by the detector 902. The burst mode receiver ASIC 903, and a number of other components in the optical repeater 900, can be powered by a power source 905. The power source 905 can be a 5-volt or a 28-volt power supply. The power source 905 can also be a connector configured to be connected to an external power supply in the airplane. The optical repeater 900 can also include a laser or light emitting diode (LED) driver 907 that drives a laser or LED 908. The laser or LED driver 907 can be driven by the electrical signal 904 generated by the burst mode receiver ASIC 903. The light generated by the laser or LED 908 can be transmitted along an output optical fiber 909. The optical signal transmitted along output optical fiber 909 can be a strengthened version of the optical signal received on input optical fiber 901. The optical repeater 900 depicted in FIG. 9 can be fairly small, such as a size of about one inch by about one half of an inch. The optical repeater can also be very stable and operate over a wide range of temperature, such as a range from about −40° C. to about 85° C. Light source controller 906 can stabilize the LED or laser light source output of repeater 900 over a wide operating temperature range, such as a range from −40° C. to 95° C. Light source controller can also include a stuck-on protection circuit configured to turn off the laser or LED driver 907 in the event that malfunction of laser or LED driver 907 causes the LED or laser to be on continuously. If the LED or laser is left in a continuously-on state, the entire data network would stop operating; the stuck-on protection circuit prevents this condition from happening.

Figure 10A:
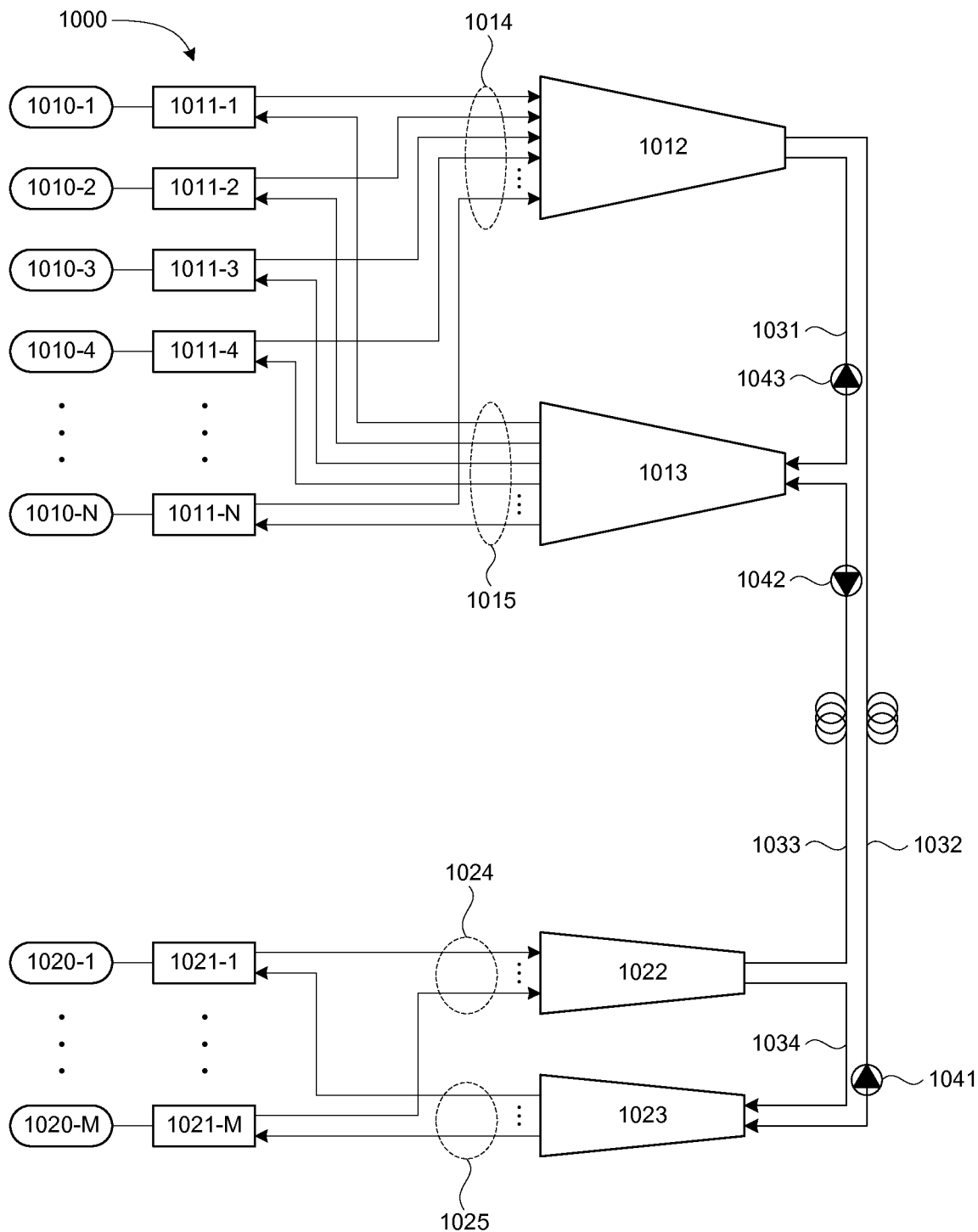
FIGS. 10A and 10B depict schematics of variations of an optical network that includes two pairs of tapered mixing rods.
Figure 10B:
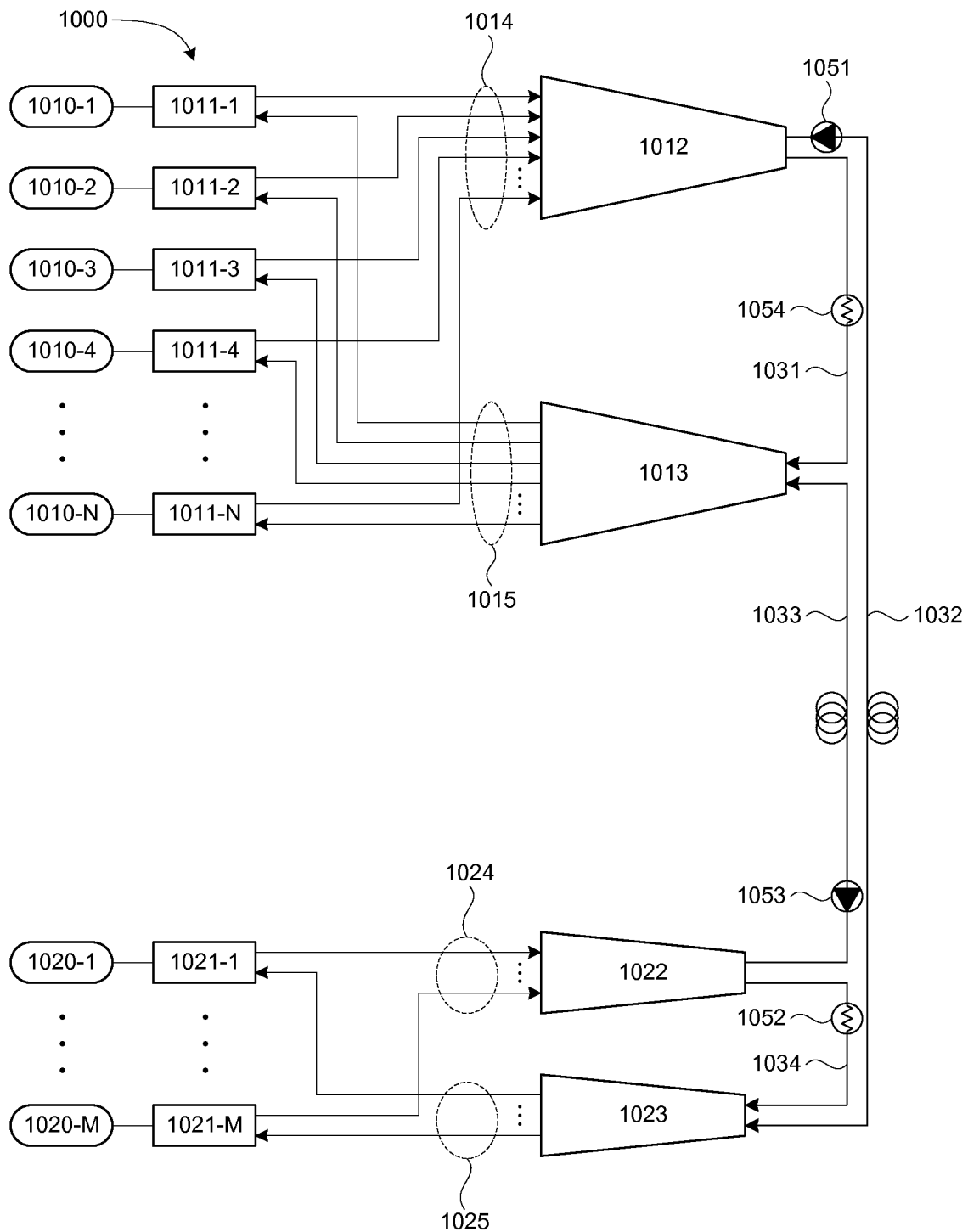

FIGS. 10A and 10B depict schematics of variations of an optical network 1000 that includes two pairs of tapered mixing rods. The optical network 1000 includes a first plurality of line replaceable units 1010, including N line replaceable unit 1010-1 through 1010-N. The system also includes a first plurality of optical-electrical media converters 1011, including N line optical-electrical media converters 1011-1 through 1011-N, with one of the first plurality of optical-electrical media converters 1011 corresponding to one of the first plurality of line replaceable units 1010. The first plurality of optical-electrical media converters 1011 convert electrical signals sent by the first plurality of line replaceable units 1010 into optical signals, and convert optical signals sent to the first plurality of line replaceable units 1010 into electrical signals. Optical signals sent out of the first plurality of optical-electrical media converters 1011 are sent to a first mixing rod 1012 via optical fibers 1014. The optical network 1000 also includes a second mixing rod 1013 connected to the first plurality of optical-electrical media converters 1011 via optical fibers 1015. The optical fibers 1015 are configured to transmit optical signals from the second mixing rod 1013 to the first plurality of optical-electrical media converters 1011.

The optical network 1000 includes a second plurality of line replaceable units 1020, including M line replaceable unit 1020-1 through 1020-M. The system also includes a second plurality of optical-electrical media converters 1021, including M line optical-electrical media converters 1021-1 through 1021-M, with one of the second plurality of optical-electrical media converters 1021 corresponding to one of the second plurality of line replaceable units 1020. The second plurality of optical-electrical media converters 1021 convert electrical signals sent by the second plurality of line replaceable units 1020 into optical signals, and convert optical signals sent to the second plurality of line replaceable units 1020 into electrical signals. Optical signals sent out of the second plurality of optical-electrical media converters 1021 are sent to a third mixing rod 1022 via optical fibers 1024. The optical network 1000 also includes a fourth mixing rod 1023 connected to the second plurality of optical-electrical media converters 1021 via optical fibers 1025. The optical fibers 1025 are configured to transmit optical signals from the fourth mixing rod 1023 to the second plurality of optical-electrical media converters 1021.

The optical network 1000 also includes optical fibers 1031, 1032, 1033, and 1034. The optical fiber 1031 is connected to the smaller ends of each of the first mixing rod 1012 and the second mixing rod 1013. The optical fiber 1031 is configured to transmit optical signals received from the first mixing rod 1012 to the second mixing rod 1013. Optical repeater 1043 can be connected to optical fiber 1031 and configured to strengthen the optical signal input to the second mixing rod 1013 to a predetermined range. The optical fiber 1032 is connected to the smaller ends of each of the first mixing rod 1012 and the fourth mixing rod 1023. The optical fiber 1032 is configured to transmit optical signals received from the first mixing rod 1012 to the fourth mixing rod 1023. The optical fiber 1033 is connected to the smaller ends of each of the second mixing rod 1013 and the third mixing rod 1022. The optical fiber 1033 is configured to transmit optical signals received from the third mixing rod 1022 to the second mixing rod 1013. The optical fiber 1034 is connected to the smaller ends of each of the third mixing rod 1022 and the fourth mixing rod 1023. The optical fiber 1034 is configured to transmit received optical signals from the third mixing rod 1022 to the fourth mixing rod 1023.

The optical fiber 1032 includes an optical repeater 1041 configured to increase the strength of optical signals propagating along optical fiber 1032. The fourth mixing rod 1023 may receive optical signals from the optical fiber 1034 within a predetermined range. In order for the fourth mixing rod 1023 to receive optical signals from the optical fiber 1032 in the same predetermined range, the optical repeater 1041 can be selected or tuned to increase a strength of optical signals propagating along the optical fiber 1032 such that optical signals propagating along the optical fiber 1032 have a strength within the predetermined range when they arrive at the fourth mixing rod 1023. The placement of the optical repeater 1041 on optical fiber 1032 can also affect the strength of the signals received by the fourth mixing rod 1023 from the optical fiber 1032. For example, in the example shown in FIG. 10A, the optical repeater 1041 is located along optical fiber 1032 closer to the fourth mixing rod 1023 than to the first mixing rod 1012. In this example, the signals received by the fourth mixing rod 1023 from the optical fiber 1032 may be stronger than a situation where the optical repeater 1041 was located closer to the first mixing rod 1012. The optical fiber 1033 includes an optical repeater 1042 configured to increase the strength of optical signals propagating along optical fiber 1033. The optical repeaters 1042 and 1043 can be selected or tuned such that the second mixing rod 1013 receives signals from the optical fiber 1033 and from the optical fiber 1031 within a predetermined range. If the signals received by the second mixing rod 1013 from the optical fiber 1033 and the optical fiber 1031 are within a predetermined range, the optical-electrical media converters 1011 do not need to have a high instantaneous dynamic range to properly receive the signals sent from the second mixing rod 1013 via optical fibers 1015.

In the variation of optical network 1000 depicted in FIG. 10B, optical fiber 1032 includes an optical repeater 1051 configured to increase the strength of optical signals propagating along optical fiber 1032. The optical repeater 1051 is located closer to the first mixing rod 1012 than to the fourth mixing rod 1023. While the optical repeater 1051 may increase the strength of the optical signals propagating along optical fiber 1032, the length of the optical fiber 1032 between the optical repeater 1051 and the fourth mixing rod 1023 may attenuate the strength of the optical signal. The optical fiber 1034 also includes an attenuator 1052 configured to attenuate optical signals propagating along optical fiber 1034. The combination of the position and function of the optical repeater 1051 and the function of attenuator 1052 can result in the fourth mixing rod 1023 receiving signals from the optical fiber 1032 and from the optical fiber 1034 with strengths within a predetermined range. Similarly, optical fiber 1033 includes an optical repeater 1053 configured to increase the strength of optical signals propagating along optical fiber 1033 and optical fiber 1031 includes an attenuator 1054 configured to attenuate optical signals propagating along optical fiber 1031. The combination of the position and function of the optical repeater 1053 and the function of attenuator 1054 can result in the second mixing rod 1013 receiving signals from the optical fiber 1031 and from the optical fiber 1033 with strengths within a predetermined range.

While not depicted in FIG. 10A or 10B, optical receivers and attenuators can be used at other locations within the optical network 1000. For example, various ones of the optical fibers 1014 can include one or more of an optical repeater and an optical attenuator. The use of optical repeaters and/or optical attenuators on various ones of the optical fibers 1014 may limit the strength of optical signals received by the first mixing rod 1012 from the optical fibers 1014 to a predetermined range of signal strengths. In addition optical repeaters and/or optical attenuators can be used on other optical fibers, such as optical fibers 1015, 1024, and 1025, to similarly adjust the strength of signals propagating on those optical fibers.

Figure 11A:
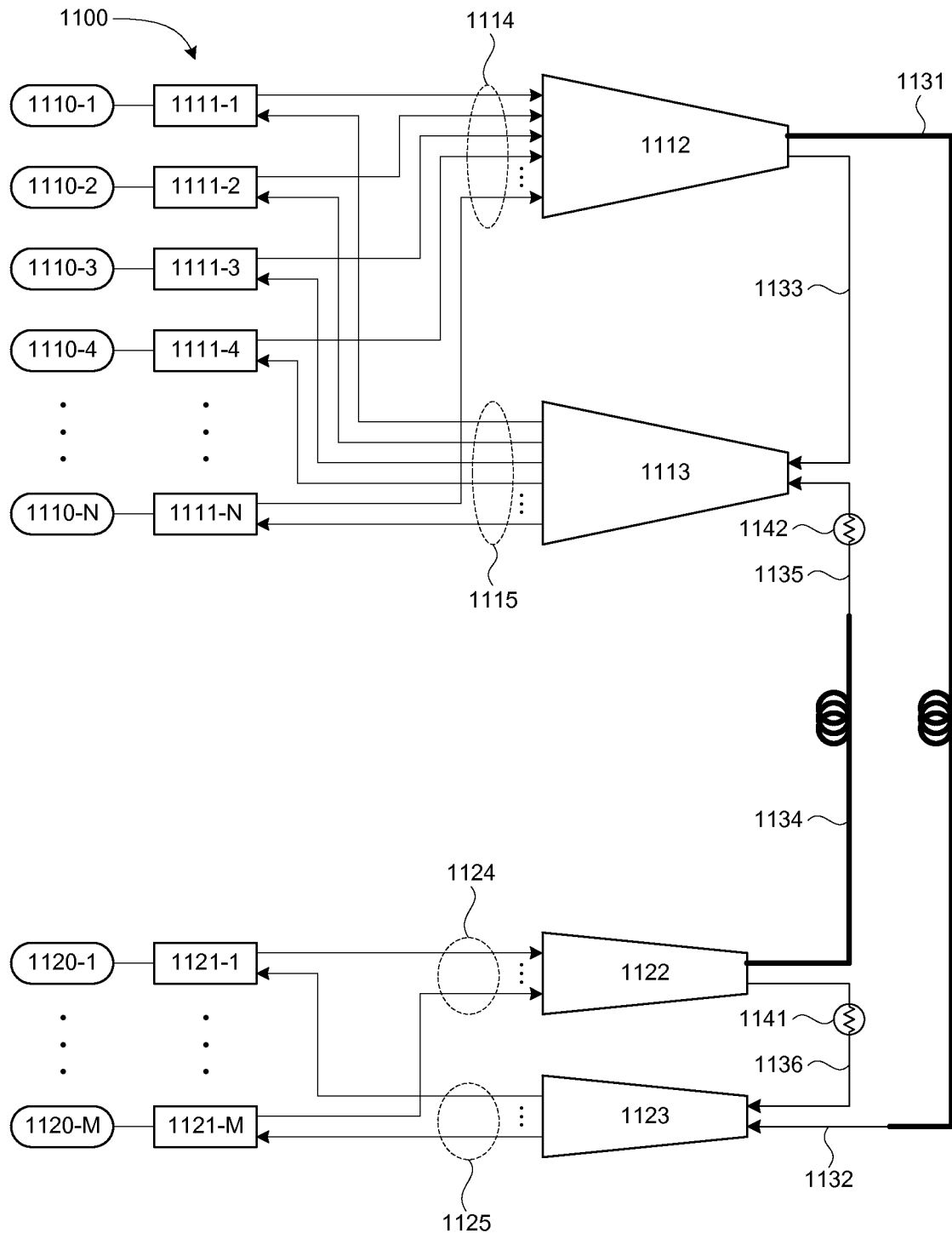
FIGS. 11A-11C depict schematics of variations of an optical network that includes two pairs of tapered mixing rods.
Figure 11B:
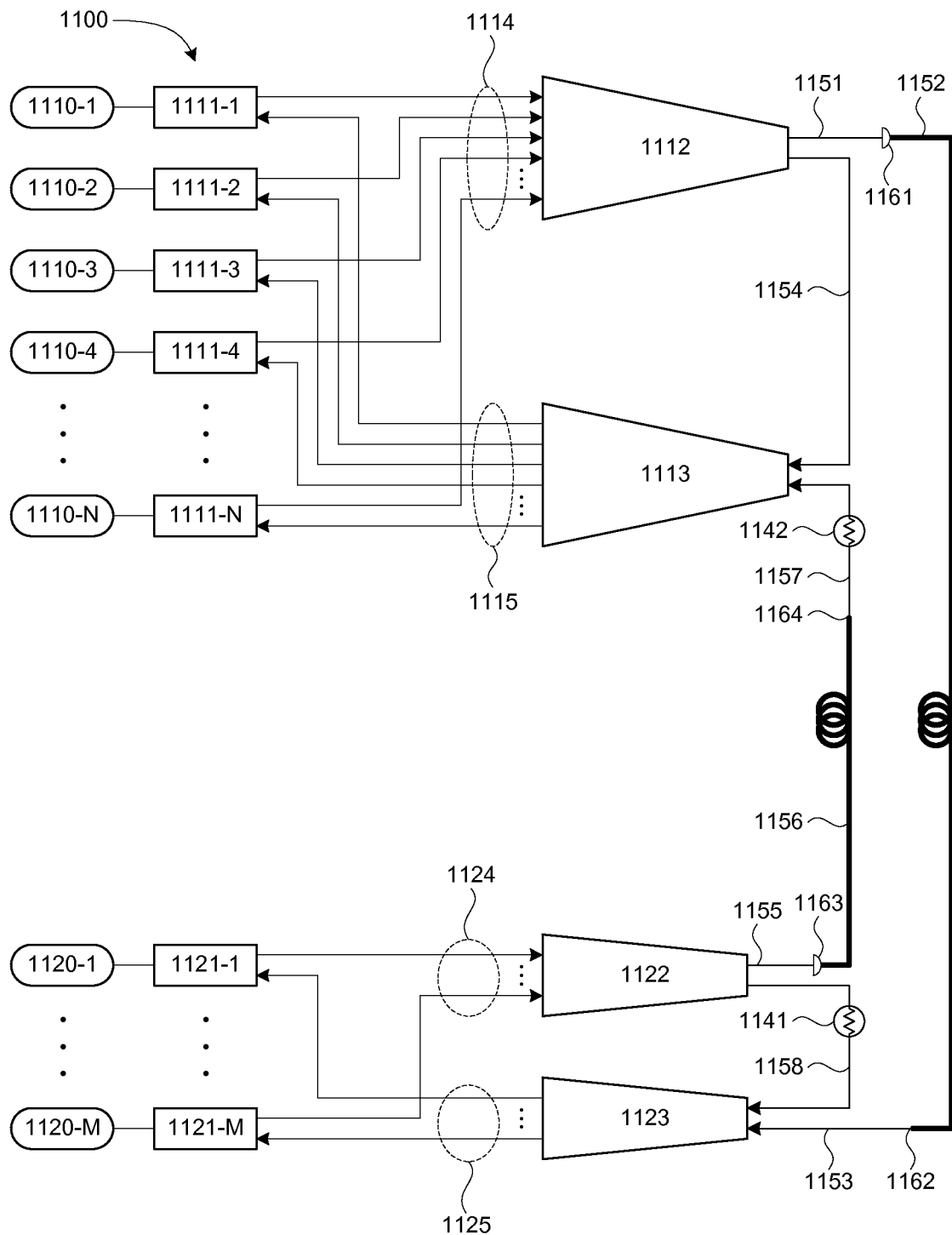
Figure 11C:
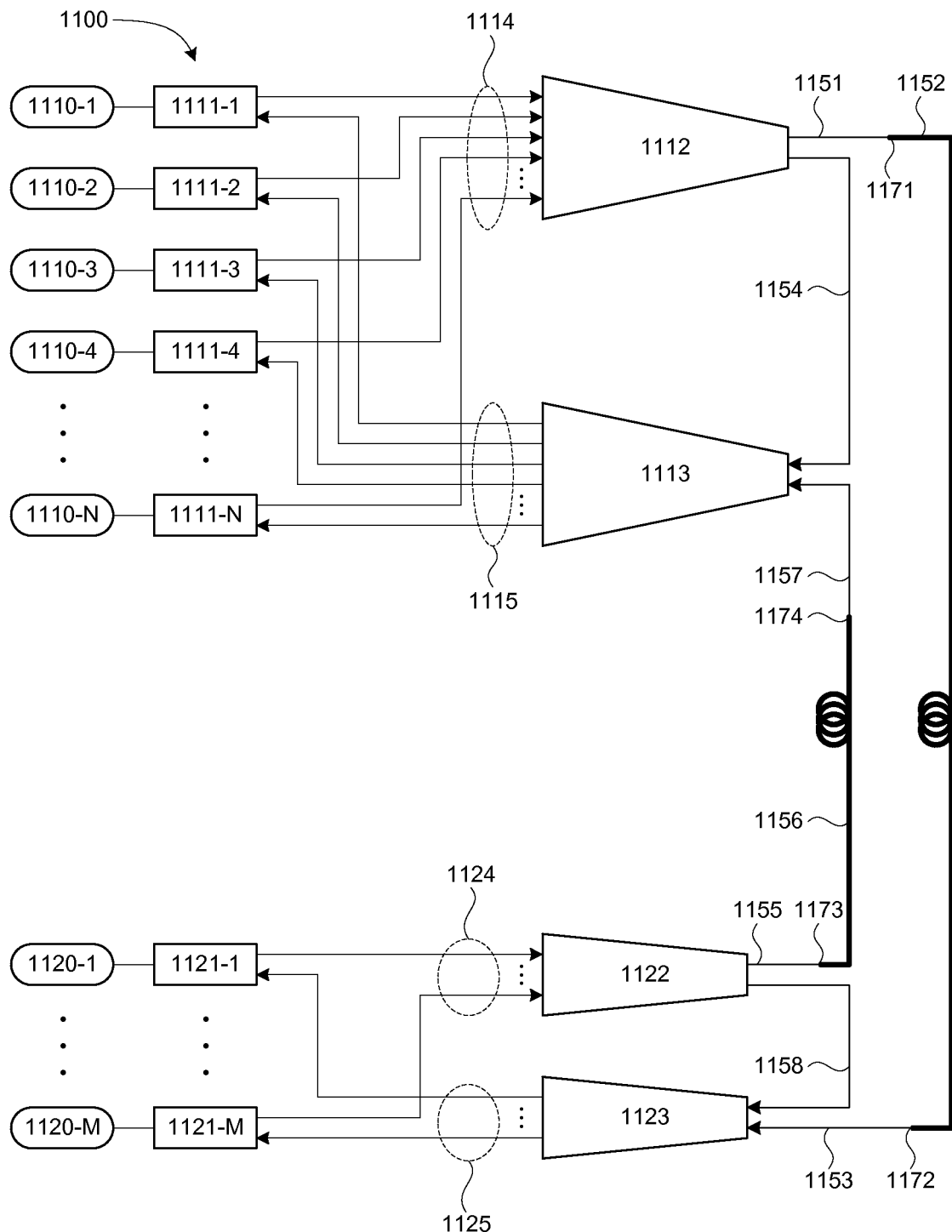

FIGS. 11A-11C depict schematics of variations of an optical network 1100 that includes two pairs of tapered mixing rods. The optical network 1100 includes a first plurality of line replaceable units 1110, including N line replaceable unit 1110-1 through 1110-N. The system also includes a first plurality of optical-electrical media converters 1111, including N line optical-electrical media converters 1111-1 through 1111-N, with one of the first plurality of optical-electrical media converters 1111 corresponding to one of the first plurality of line replaceable units 1110. The first plurality of optical-electrical media converters 1111 convert electrical signals sent by the first plurality of line replaceable units 1110 into optical signals, and convert optical signals sent to the first plurality of line replaceable units 1110 into electrical signals. Optical signals sent out of the first plurality of optical-electrical media converters 1111 are sent to a first mixing rod 1112 via optical fibers 1114. The optical network 1100 also includes a second mixing rod 1113 connected to the first plurality of optical-electrical media converters 1111 via optical fibers 1115. The optical fibers 1115 are configured to transmit optical signals from the second mixing rod 1113 to the first plurality of optical-electrical media converters 1111.

The optical network 1100 includes a second plurality of line replaceable units 1120, including M line replaceable unit 1120-1 through 1120-M. The system also includes a second plurality of optical-electrical media converters 1121, including M line optical-electrical media converters 1121-1 through 1121-M, with one of the second plurality of optical-electrical media converters 1121 corresponding to one of the second plurality of line replaceable units 1120. The second plurality of optical-electrical media converters 1121 convert electrical signals sent by the second plurality of line replaceable units 1120 into optical signals, and convert optical signals sent to the second plurality of line replaceable units 1120 into electrical signals. Optical signals sent out of the second plurality of optical-electrical media converters 1121 are sent to a third mixing rod 1122 via optical fibers 1024. The optical network 1100 also includes a fourth mixing rod 1123 connected to the second plurality of optical-electrical media converters 1121 via optical fibers 1125. The optical fibers 1125 are configured to transmit optical signals from the fourth mixing rod 1123 to the second plurality of optical-electrical media converters 1121.

In the variation of optical network 1100 depicted in FIG. 11A, optical signals are transmitted from the first mixing rod 1112 to the fourth mixing rod 1123 via optical fiber 1131 and optical fiber 1132. Optical fiber 1131 may be a glass optical fiber, such as a hard clad silica (HCS) optical fiber or other form of glass optical fiber. Losses in signal strength are generally lower with glass optical fibers than with plastic optical fibers due to the material difference in these two different fiber types. Some plastic optical fibers have a loss of about 0.2 dB/m while some glass optical fibers have negligible optical loss up to lengths of 100 meters (e.g. glass optical fiber loss is 0.08 dB/km or less, 100 meter loss is only 0.8 dB or less). Thus, using a glass optical fiber may be advantageous with longer sections of optical fibers. Glass optical fibers are also less rugged and tend to break more frequently than plastic optical fibers. Glass optical fibers are also generally heavier than plastic optical fibers. Glass optical fibers also generally have a larger bend radius than plastic optical fibers, making them more difficult to install in tight places. For example, a 400 micron glass optical fiber may have a 47 mm bend radius, and a 1 mm glass optical fiber may have a 118 mm bend radius. The choice of using glass optical fibers and/or plastic optical fibers may depend on desired characteristics of any given system. At the connection between optical fiber 1131 and optical fiber 1132, an optical connector may be used to properly interface the optical fiber 1131 and optical fiber 1132. Optical signals are also transmitted from the third mixing rod 1122 to the fourth mixing rod 1123 via optical fiber 1136. Optical fiber 1136 can also have an optical attenuator 1141. The optical attenuator 1141 may be employed to bring the strengths of the signals entering the fourth mixing rod 1123 from optical fiber 1132 and from optical fiber 1136 into a predetermined range.

Optical signals are transmitted from the third mixing rod 1122 to the second mixing rod 1113 via optical fiber 1134 and optical fiber 1135. Optical fiber 1134 may be a glass optical fiber and optical fiber 1135 may be a plastic optical fiber. At the connection between optical fiber 1134 and optical fiber 1135, an optical connector may be used to properly interface the optical fiber 1134 and optical fiber 1135. Optical signals are also transmitted from the first mixing rod 1112 to the second mixing rod 1113 via optical fiber 1133. Optical fiber 1135 can also have an optical attenuator 1142. The optical attenuator 1142 may be employed to bring the strengths of the signals entering the second mixing rod 1113 from optical fiber 1133 and from optical fiber 1135 into a predetermined range.

In the variation of optical network 1100 depicted in FIG. 11B, optical signals are transmitted from the first mixing rod 1112 to the fourth mixing rod 1123 via optical fiber 1151, optical fiber 1152, and optical fiber 1153. Optical fibers 1151 and 1153 may be plastic optical fibers while optical fiber 1152 may be a glass optical fiber. Optical fibers 1151 and 1153 may have a different diameter than optical fiber 1152. For example, if optical fibers 1151 and 1153 are plastic optical fibers and optical fiber 1152 is a glass optical fiber, the diameter of optical fibers 1151 and 1153 may be greater than the diameter of optical fiber 1152. At the connection 1161 between optical fiber 1151 and optical fiber 1152, a hemispherical lens may be employed to ensure proper transmission of optical signals from optical fiber 1151 with a larger diameter to optical fiber 1152 with a smaller diameter. Hemispherical lenses are discussed in greater detail below with respect to FIGS. 12A-12D. At the connection 1162 between optical fiber 1152 and optical fiber 1153, no hemispherical lens may be needed. The connections 1161 and 1163 may include an optical connector to properly interface the connecting optical fibers. Optical signals are also transmitted from the third mixing rod 1122 to the fourth mixing rod 1123 via optical fiber 1158. Optical fiber 1158 can also have an optical attenuator 1141. The optical attenuator 1141 may be employed to bring the strengths of the signals entering the fourth mixing rod 1123 from optical fiber 1153 and from optical fiber 1158 into a predetermined range.

Optical signals are transmitted from the third mixing rod 1122 to the second mixing rod 1113 via optical fiber 1155, optical fiber 1156, and optical fiber 1157. Optical fibers 1155 and 1157 may be plastic optical fibers while optical fiber 1156 may be a glass optical fiber. At the connection 1163 between optical fiber 1155 and optical fiber 1156, a hemispherical lens may be employed to ensure proper transmission of optical signals from optical fiber 1155 with a larger diameter to optical fiber 1156 with a smaller diameter. At the connection 1164 between optical fiber 1156 and optical fiber 1157, no hemispherical lens may be needed. The connections 1163 and 1164 may include an optical connector to properly interface the connecting optical fibers. Optical signals are also transmitted from the first mixing rod 1112 to the second mixing rod 1113 via optical fiber 1154. Optical fiber 1157 can also have an optical attenuator 1142. The optical attenuator 1142 may be employed to bring the strengths of the signals entering the second mixing rod 1113 from optical fiber 1154 and from optical fiber 1157 into a predetermined range.

In the variation of optical network 1100 depicted in FIG. 11C, optical signals are transmitted from the first mixing rod 1112 to the fourth mixing rod 1123 via optical fiber 1151, optical fiber 1152, and optical fiber 1153. Optical fibers 1151 and 1153 may be plastic optical fibers while optical fiber 1152 may be a glass optical fiber. Even if optical fibers 1151 and 1153 are plastic optical fibers and optical fiber 1152 is a glass optical fiber, optical fibers 1151-1153 may have the same diameter. In such a case, at connection 1171 between optical fiber 1151 and optical fiber 1152, no hemispherical lens may be necessary. At the connection 1172 between optical fiber 1152 and optical fiber 1153, no hemispherical lens may be needed. In addition, no optical attenuator may be necessary on optical fiber 1153 or optical fiber 1158 to bring the strengths of the signals entering the fourth mixing rod 1123 from optical fiber 1153 and from optical fiber 1158 into a predetermined range. For example, if the optical signals leaving the first mixing rod 1112 and the third mixing rod 1122 are similar and if the losses incurred by a signal propagating along optical fibers 1151-1153 are similar to the losses incurred by a signal propagating along optical fiber 1158, then no optical repeater or optical attenuator would be needed to bring the strengths of the signals entering the fourth mixing rod 1123 from optical fiber 1153 and from optical fiber 1158 into a predetermined range.

Optical signals are transmitted from the third mixing rod 1122 to the second mixing rod 1113 via optical fiber 1155, optical fiber 1156, and optical fiber 1157. Optical fibers 1155 and 1157 may be plastic optical fibers while optical fiber 1156 may be a glass optical fiber. Even if optical fibers 1155 and 1157 are plastic optical fibers and optical fiber 1156 is a glass optical fiber, optical fibers 1155-1157 may have the same diameter. In such a case, at connection 1173 between optical fiber 1155 and optical fiber 1156, no hemispherical lens may be necessary. At the connection 1174 between optical fiber 1156 and optical fiber 1157, no hemispherical lens may be needed. In addition, no optical attenuator may be necessary on optical fiber 1157 or optical fiber 1154 to bring the strengths of the signals entering the second mixing rod 1113 from optical fiber 1154 and from optical fiber 1157 into a predetermined range.

Figure 12A:
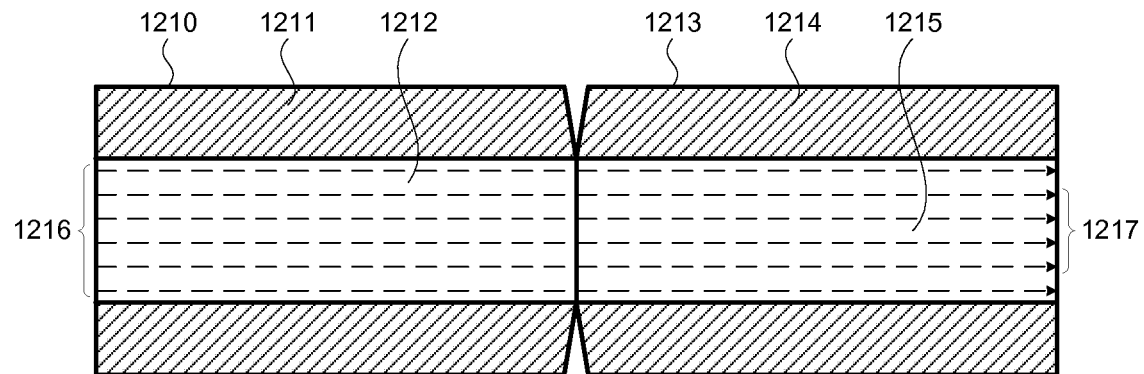
FIGS. 12A-12D depict examples of connections between optical fibers.

FIGS. 12A-12D depict examples of connections between optical fibers. FIG. 12A depicts a connection between a first optical fiber 1210 and a second optical fiber 1213. The first optical fiber 1210 has a protective sheath 1211 and an optical core 1212. The second optical fiber 1213 has a protective sheath 1214 and an optical core 1215. In the example shown in FIG. 12A, the optical core 1212 of the first optical fiber 1210 has substantially the same diameter as the optical core 1215 of the second optical fiber 1213. The optical cores 1212 and 1215 may both be of the same material, such as a plastic material or glass material, or they may be of different materials. Because the optical core 1212 of the first optical fiber 1210 has substantially the same diameter as the optical core 1215 of the second optical fiber 1213, input light 1216 entering along the first optical fiber 1210 can pass into the second optical fiber 1213 and exit as light 1217 with minimal losses.

Figure 12B:
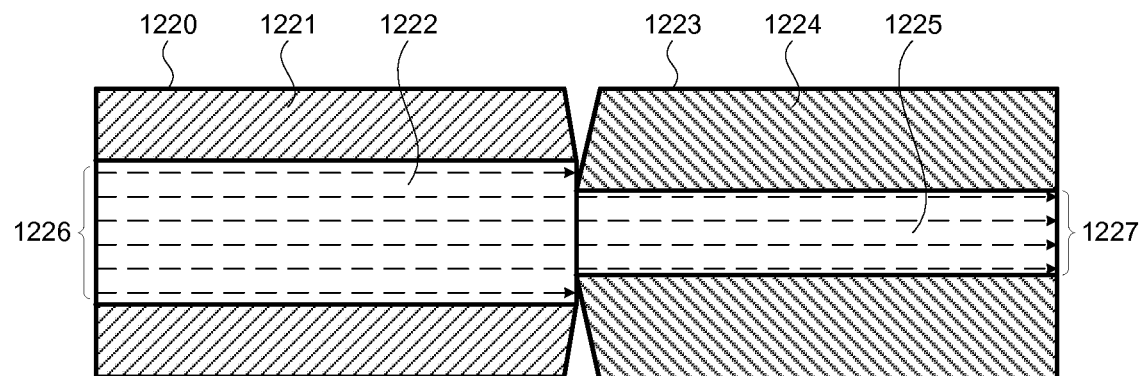

FIG. 12B depicts a connection between a first optical fiber 1220 and a second optical fiber 1223. The first optical fiber 1220 has a protective sheath 1221 and an optical core 1222. The second optical fiber 1223 has a protective sheath 1224 and an optical core 1225. In the example shown in FIG. 12B, the optical core 1222 of the first optical fiber 1220 has a different diameter than the optical core 1225 of the second optical fiber 1223. In one example, the optical core 1222 can have a diameter of 1 mm while the optical core 1225 can have a diameter of 400 microns. Even though the diameters of the optical cores 1222 and 1225 may be different, the outer diameters of the protective sheaths 1221 and 1224 may still be substantially the same. The optical cores 1222 and 1225 may both be of the same material, such as a plastic material or glass material, or they may be of different materials. Because the optical core 1222 of the first optical fiber 1220 is greater than the diameter of the optical core 1225 of the second optical fiber 1223, not all of the input light 1226 entering along the first optical fiber 1220 passes into the second optical fiber 1213. Thus, significantly less light 1227 will exit along the second optical fiber 1223 than entered along the first optical fiber 1220.

Figure 12C:
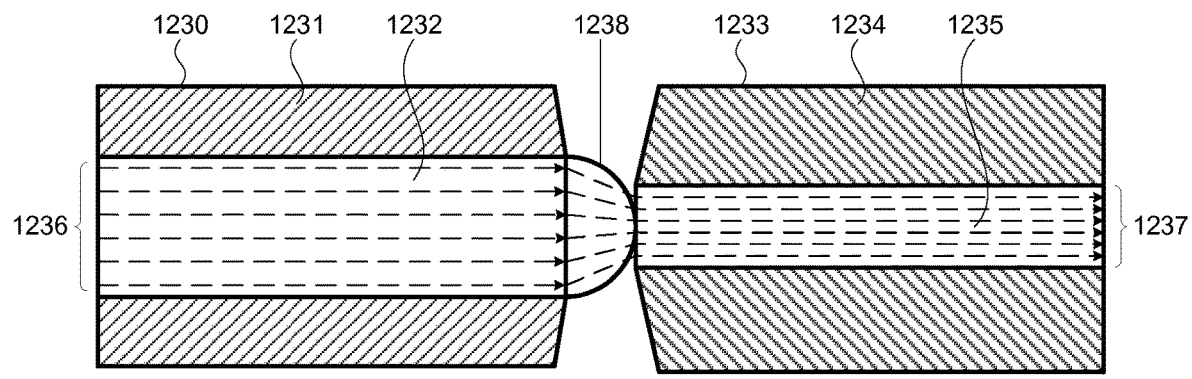

FIG. 12C depicts one example of overcoming the losses of light shown in FIG. 12B. FIG. 12C depicts a connection between a first optical fiber 1230 and a second optical fiber 1233. The first optical fiber 1230 has a protective sheath 1231 and an optical core 1232. The second optical fiber 1233 has a protective sheath 1234 and an optical core 1235. The optical core 1232 of the first optical fiber 1230 has a larger optical core diameter than the optical core 1235 of the second optical fiber 1233. A hemispherical lens 1238 is placed in the connection between the first optical fiber 1230 and the second optical fiber 1233. As light 1236 entering the first optical fiber 1230 encounters the hemispherical lens 1238, the hemispherical lens 1238 focuses the light to the smaller diameter of the optical core 1235 of the second optical fiber 1233. Because the hemispherical lens 1238 focuses substantially all of the light 1236 to the optical core 1235 of the second optical fiber 1233, substantially all of the input light 1236 entering along the first optical fiber 1230 can pass into the second optical fiber 1233 and exit as light 1237 with much lower loss than mating shown in FIG. 12B.

Figure 12D:
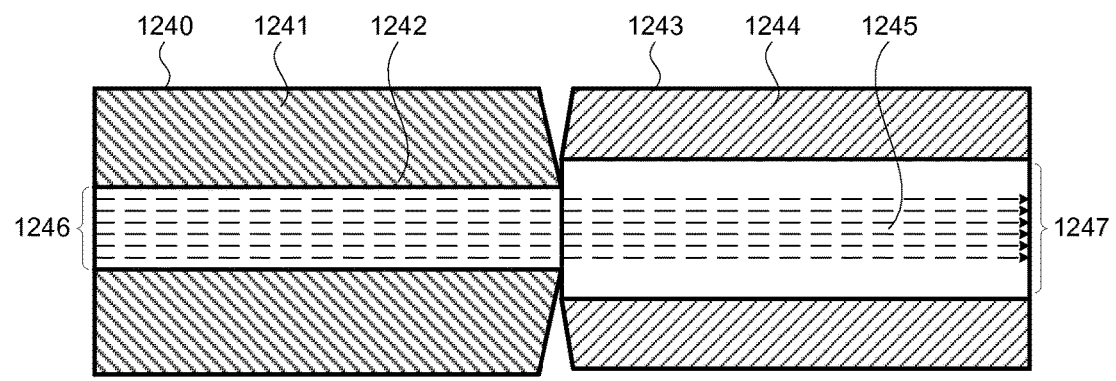

FIG. 12D depicts a connection between a first optical fiber 1240 and a second optical fiber 1243. The first optical fiber 1240 has a protective sheath 1241 and an optical core 1242. The second optical fiber 1243 has a protective sheath 1244 and an optical core 1245. In the example shown in FIG. 12D, the optical core 1242 of the first optical fiber 1240 has a smaller diameter than the optical core 1245 of the second optical fiber 1243. Because the optical core 1242 of the first optical fiber 1240 has a smaller diameter than the optical core 1245 of the second optical fiber 1243, substantially all of the input light 1246 entering along the first optical fiber 1240 can pass into the second optical fiber 1243 and exit as light 1247 with minimal losses.

The above examples of optical networks with pairs of mixing rods include two pairs of mixing rods. However, optical networks are not limited to merely two pairs of mixing rods. FIG. 13 depicts an example of an optical network with three pairs of mixing rods. A first pair of mixing rods 1310 and 1320 can be connected to a number X of line replaceable units. Where each of the mixing rods 1310 and 1320 is connected to X line replaceable units on one side and three transmission lines on the other side, each of the mixing rods 1310 and 1320 is a 3×X mixing rod. A second pair of mixing rods 1330 and 1340 can be connected to a number Y of line replaceable units. Where each of the mixing rods 1330 and 1340 is connected to Y line replaceable units on one side and three transmission lines on the other side, each of the mixing rods 1330 and 1340 is a 3×Y mixing rod. A third pair of mixing rods 1350 and 1360 can be connected to a number Z of line replaceable units. Where each of the mixing rods 1350 and 1360 is connected to Z line replaceable units on one side and three transmission lines on the other side, each of the mixing rods 1350 and 1360 is a 3×Z mixing rod. The smaller side of each of the mixing rods has three outputs or inputs as there are three pairs of mixing rods that need to be connected to each other. Similar systems can be used to scale up the numbers of pairs of mixing rods used in any given optical network.

In the optical networks described here, the optical signals may be created using any color of light. Red light is a common light used in optical systems, though other colors may be used. It may be advantageous to use green light in optical systems. Green LED transmitters can have a 10 dBm peak optical power. Green light has a shorter wavelength (about 500 nm) than red light (about 650 nm), and shorter wavelengths experience lower losses in plastic optical fibers than longer wavelengths. For example, green light may experience a maximum loss of about 0.15 dB/m in plastic optical fiber as compare to red light which has optical loss about 0.2 dB/m in plastic optical fiber. Even under worst case scenarios, the maximum loss experienced by green light in plastic optical fiber may allow an optical network to be an all plastic optical networks. Using all plastic optical fibers in an environment such as an aircraft would save significant weight and space while being more rugged than a network that includes some glass optical fibers.

While the examples above discuss a single optical network in a vehicle, it is possible to have multiple optical networks in a single vehicle. For example, in an aircraft environment, redundant optical networks may be used to connect line replaceable units to reduce the likelihood that line replaceable units lose connection with each other. Such redundant networks could all be optical networks or some combination of optical and electrical networks. Replacing electrical bus systems with optical fiber networks can have significant savings. For example, in a commercial aircraft, the weight of the optical network can be as much as 350 pounds less than the weight of a corresponding electrical network, the size of the optical network can be as much as 15 cubic feet less that the size of a corresponding electrical network, the power consumption of an optical network can be as much as 600 watts less than the power consumption of a corresponding electrical network, and the cost of the optical network can be as much as $250,000 less that the cost of a corresponding electrical network. Moreover, an optical network generally does not have the risk of electromagnetic interference posed by an electrical network.

Figure 14:
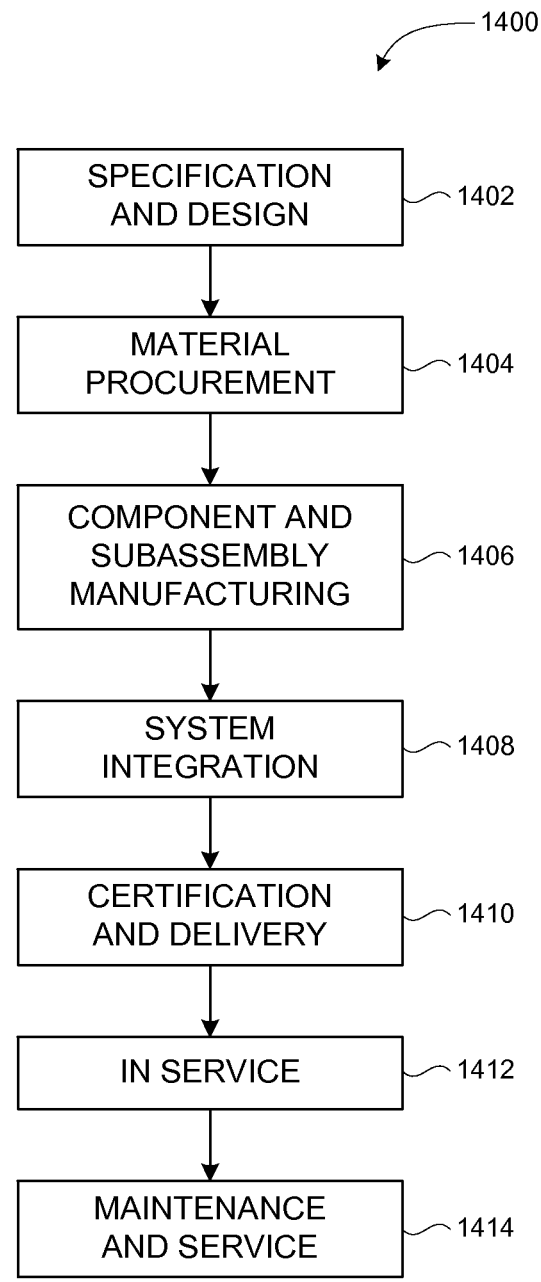
FIG. 14 depicts a flow diagram of an aircraft production and service methodology.
Figure 15:
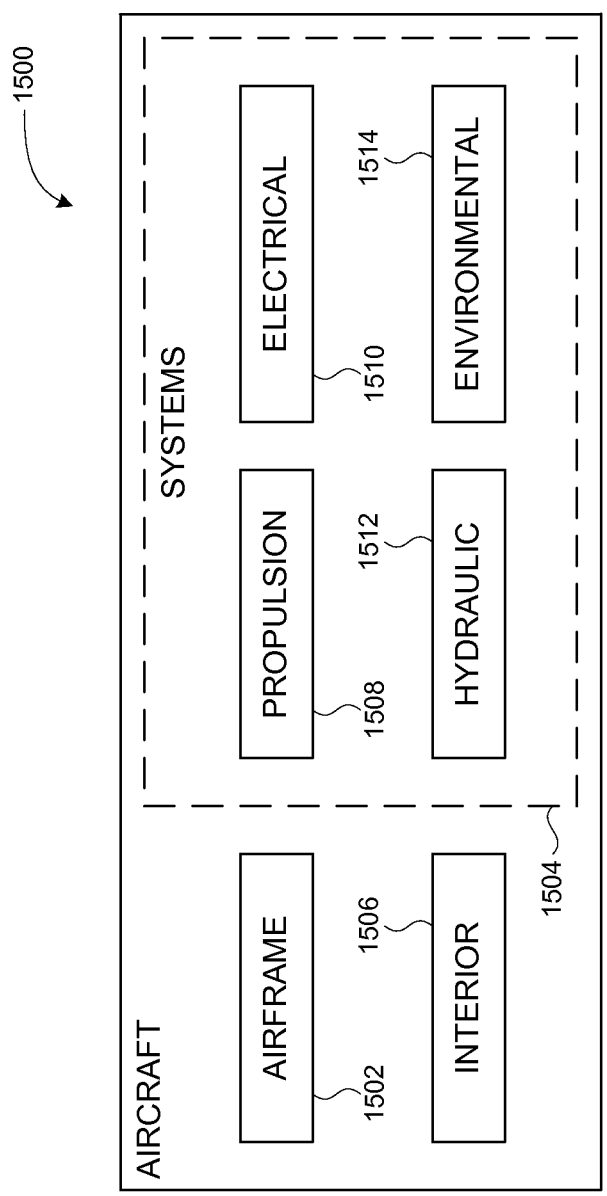
FIG. 15 depicts a block diagram of an aircraft.

Examples in this disclosure may be described in the context of aircraft manufacturing and service method 1400 as shown in FIG. 14 and an aircraft 1500 as shown in FIG. 15. During pre-production, aircraft manufacturing and service method 1400 may include specification and design 1402 of aircraft 1500 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service by a customer, aircraft 1500 is scheduled for routine maintenance and service 1414 (which may also include modification, reconfiguration, refurbishment, and so on).

Each of the processes of aircraft manufacturing and service method 1400 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 15, aircraft 1500 produced by aircraft manufacturing and service method 1400 may include airframe 1502 with a plurality of systems 1504 and interior 1506. Examples of systems 1504 include one or more of propulsion system 1508, electrical system 1510, hydraulic system 1512, and environmental system 1514. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 1400. For example, without limitation, components or subassemblies corresponding to component and subassembly manufacturing 1406 may be fabricated or manufactured in a manner similar to components or subassemblies produced while aircraft 1500 is in service.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

While certain example or illustrative embodiments have been described, these embodiments have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed is:

1. An optical network architecture comprising:
   a first pair of tapered mixing rods comprising a first mixing rod and a second mixing rod;
   a second pair of tapered mixing rods comprising a third mixing rod and a fourth mixing rod;
   a first plurality of plastic optical fibers directly coupled to transmit light from the first pair of tapered mixing rods to a first plurality of line replaceable units;
   a second plurality of plastic optical fibers directly coupled to transmit light from the second pair of tapered mixing rods to a second plurality of line replaceable units;
   a first local plastic optical fiber directly coupled to transmit light from the first mixing rod to the second mixing rod such that light received by the first pair of tapered mixing rods from any of the first plurality of line replaceable units will be communicated to others of the first plurality of line replaceable units;
   a second local plastic optical fiber directly coupled to transmit light from the third mixing rod to the fourth mixing rod such that light received by the second pair of tapered mixing rods from any of the second plurality of line replaceable units will be communicated to others of the second plurality of line replaceable units; and
   at least one plastic optical fiber directly connected from a first face of one of the first pair of tapered mixing rods to a second face of one of the second pair of tapered mixing rods such that a first end of the at least one plastic optical fiber is connected to the first face of one of the first pair of tapered mixing rods and a second end of the at least one plastic optical fiber is connected to the second face of one of the second pair of tapered mixing rods.

2. The optical network architecture of claim 1, wherein a first end of the at least one plastic optical fiber is coupled to one of the first pair of tapered mixing rods.

3. The optical network architecture of claim 2, wherein a second end of the at least one plastic optical fiber is coupled to one of the second pair of tapered mixing rods.

4. The optical network architecture of claim 1, wherein the first mixing rod, the second mixing rod, the third mixing rod, and the fourth mixing rod each are tapered from a smaller end to a larger end;
   the first local plastic optical fiber is directly coupled from the smaller end of the first mixing rod to the smaller end of the second mixing rod; and
   the second local plastic optical fiber is directly coupled from the smaller end of the third mixing rod to the smaller end of the fourth mixing rod.

5. The optical network architecture of claim 1, wherein the at least one plastic optical fiber comprises:
   a first plastic optical fiber directly coupled from the first mixing rod to the fourth mixing rod; and
   a second plastic optical fiber directly coupled from the third mixing rod to the second mixing rod.

6. The optical network architecture of claim 5, further comprising:
   a first optical repeater located on the first plastic optical fiber.

7. The optical network architecture of claim 6, wherein the first optical repeater is configured to increase a signal strength of optical signals propagating along the first plastic optical fiber such that optical signals received by the fourth mixing rod from the first plastic optical fiber are within a predetermined range.

8. The optical network architecture of claim 6, further comprising:
   a second optical repeater located on the second plastic optical fiber.

9. The optical network architecture of claim 8, wherein the second optical repeater is configured to increase a signal strength of optical signals propagating along the second plastic optical fiber such that optical signals received by the second mixing rod from the second plastic optical fiber are within a predetermined range.

10. A method of transmitting optical signals comprising:
    receiving, by a first tapered mixing rod of a first pair of tapered mixing rods, optical signals from a first plurality of plastic optical fibers directly coupled to a first plurality of line replaceable units;
    directing, by the first tapered mixing rod, the optical signals received from the first plurality of plastic optical fibers along each of a first plastic optical fiber and a second plastic optical fiber;
    receiving, by a third tapered mixing rod of a second pair of tapered mixing rods, optical signals from a second plurality of plastic optical fibers directly coupled to a second plurality of line replaceable units;
    directing, by the third tapered mixing rod, the optical signals received from the second plurality of plastic optical fibers along a third plastic optical fiber directly connected to the third tapered mixing rod;

receiving, by a second tapered mixing rod of the first pair of tapered mixing rods, optical signals from the second plastic optical fiber and the third plastic optical fiber directed connected to the second tapered mixing rod; and directing, by the second tapered mixing rod, the optical signals received from the second plastic optical fiber and the third plastic optical fiber along each of a second plurality of plastic optical fibers directly coupled to the first plurality of line replaceable units.

11. The method of claim 10, further comprising:

receiving, by a third tapered mixing rod, optical signals from a third plurality of plastic optical fibers directly coupled to a second plurality of line replaceable components;

directing, by the third tapered mixing rod, the optical signals received from the third plurality of plastic optical fibers along each of the third plastic optical fiber and a fourth plastic optical fiber;

receiving, by a fourth tapered mixing rod, optical signals from the first plastic optical fiber and the fourth plastic optical fiber; and directing, by the fourth tapered mixing rod, the optical signals received from the first plastic optical fiber and the fourth plastic optical fiber along each of a fourth plurality of plastic optical fibers directly coupled to the second plurality of line replaceable components.

12. The method of claim 11, further comprising:

increasing a strength of optical signals propagating along the first plastic optical fiber.

13. The method of claim 12, wherein the increasing a strength of optical signals propagating along the first plastic optical fiber is performed by an optical repeater, and wherein a location of the optical repeater and an increase in the strength of optical signals propagating along the first plastic optical fiber by the optical repeater are selected such that optical signals received by the fourth tapered mixing rod from the first plastic optical fiber are within a first predetermined range of optical signal strengths.

14. The method of claim 13, further comprising:

attenuating optical signals propagating along the fourth plastic optical fiber such that a strength of optical signals received by the fourth tapered mixing rod from the fourth plastic optical fiber are within the first predetermined range of optical signal strengths.

15. The method of claim 14, further comprising:

increasing a strength of optical signals propagating along the third plastic optical fiber such that optical signals received by the second tapered mixing rod from the third plastic optical fiber are within a second predetermined range of optical signal strengths.

16. The method of claim 15, further comprising:

attenuating optical signals propagating along the second plastic optical fiber such that a strength of optical signals received by the second tapered mixing rod from the second plastic optical fiber are within the second predetermined range of optical signal strengths.

17. An aircraft optical network comprising:

a first pair of tapered mixing rods located at a front end of an aircraft, where the first tapered pair of mixing rods comprise a first mixing rod and a second mixing rod;

a second pair of tapered mixing rods located at a back end of the aircraft, where the second tapered pair of mixing rods comprise a third mixing rod and a fourth mixing rod;

a first plurality of plastic optical fibers directly coupled from the first pair of tapered mixing rods to a first plurality of line replaceable units, the first plurality of line replaceable units located at the front end of the aircraft;

a second plurality of plastic optical fibers directly coupled from the second pair of tapered mixing rods to a second plurality of line replaceable units, the second plurality of line replaceable units located at the back end of the aircraft;

a first local plastic optical fiber directly coupled from the first mixing rod to the second mixing rod;

a second local plastic optical fiber directly coupled from the third mixing rod to the fourth mixing rod; and at least one plastic optical fiber directly connected from a first face of one of the first pair of tapered mixing rods to a second face of one of the second pair of tapered mixing rods such that a first end of the at least one plastic optical fiber is connected to the first face of one of the first pair of tapered mixing rods and a second end of the at least one plastic optical fiber is connected to the second face of one of the second pair of tapered mixing rods;

wherein light sent from any of the first plurality of line replaceable units to the first pair of tapered mixing rods will be received by others of the second plurality of line replaceable units.

18. The aircraft optical network of claim 17, wherein the at least one plastic optical fiber has a length in a range from 60 meters to 100 meters.

19. The aircraft optical network of claim 18, further comprising:

at least one optical repeater located on the at least one plastic optical fiber, wherein the at least one optical repeater is configured to increase a strength of optical signals propagating along the at least one plastic optical fiber.

20. The aircraft optical network of claim 19, wherein the first plurality of plastic optical fibers and the second plurality of plastic optical fibers have lengths equal to or less than 20 meters.

* * * * *